(12) United States Patent
Moriki et al.

(10) Patent No.: US 9,396,013 B2
(45) Date of Patent: *Jul. 19, 2016

(54) METHOD FOR CONTROLLING A VIRTUAL MACHINE AND A VIRTUAL MACHINE SYSTEM

(71) Applicant: HITACHI, LTD., Chiyoda-ku, Tokyo (JP)

(72) Inventors: Toshiomi Moriki, Kokubunji (JP); Naoya Hattori, Hadano (JP); Yuji Tsushima, Hachioji (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/633,991

(22) Filed: Feb. 27, 2015

(65) Prior Publication Data
US 2015/0169346 A1 Jun. 18, 2015

Related U.S. Application Data

(63) Continuation of application No. 12/213,287, filed on Jun. 17, 2008, now Pat. No. 9,009,701.

(30) Foreign Application Priority Data

Jun. 22, 2007 (JP) ................. 2007-164892

(51) Int. Cl.
*G06F 9/455* (2006.01)
(52) U.S. Cl.
CPC ........ *G06F 9/45545* (2013.01); *G06F 9/45558* (2013.01); *G06F 2009/45566* (2013.01); *G06F 2009/45575* (2013.01)

(58) Field of Classification Search
CPC ................. G06F 9/45545; G06F 2009/45575
USPC ............................................................ 718/1
See application file for complete search history.

(56) References Cited

U.S. PATENT DOCUMENTS 4,792,895 A 12/1988 Tallman
7,305,592 B2 12/2007 Neiger et al.
(Continued)

FOREIGN PATENT DOCUMENTS

JP 2005-529401 5/2003

OTHER PUBLICATIONS

Hennessy, John L., and David A. Patterson. Computer architecture: a quantitative approach. 2011. Second Edition. pp. 39-40.*

(Continued)

*Primary Examiner* — Andrew Caldwell
*Assistant Examiner* — Keith Nielsen
(74) *Attorney, Agent, or Firm* — Mattingly & Malur, PC

(57) ABSTRACT

A next-generation OS with a virtualization feature is executed as a user program on a first virtual processor by selecting, in response to a cause of a call for a host VMM, one of a guest status area (221) for executing a user program on a second virtual processor and a host status area (222) for executing the guest VMM, and by updating a guest status area (131) of a shadow VMCS for controlling a physical processor. Accordingly, without a decrease in performance of a virtual computer, the next-generation OS incorporating the virtualization feature is executed on a virtual server, and the next-generation OS and an existing OS are integrated on a single physical computer.

15 Claims, 22 Drawing Sheets

(56) References Cited

U.S. PATENT DOCUMENTS

| | | |
|---|---|---|
| 7,533,207 B2 | 5/2009 | Traut et al. |
| 2003/0037089 A1 | 2/2003 | Cota-Robles et al. |
| 2005/0081199 A1* | 4/2005 | Traut .............................. 718/1 |
| 2005/0132363 A1* | 6/2005 | Tewari et al. ..................... 718/1 |
| 2006/0015869 A1* | 1/2006 | Neiger et al. ..................... 718/1 |
| 2006/0123184 A1 | 6/2006 | Mondal et al. |

OTHER PUBLICATIONS

Wikipedia: "CPUID" article. May 16, 2007. 3 pages.

Intel® Itanium® Architecture Software Developer's Manual, vol. 2: System Architecture; Revision 2.3, May 2010, 676 pages, with the relevant portions as follows: § 11.7 PAL Virtualization Support (starting on p. 2:324).

"AMD-Virtualization™ (AMD-V)", Mar. 6, 2007; 13 pages in Japanese and partial English.

"Chapter 5 VMX Instruction Reference"; VMX Instruction Reference, vol. 2B, pp. 5-1 to 5-30.

"AMD64 Architecture Programmer's Manual vol. 2: System Programming"; AMD64 Technology, No. 24395, Rev. 3.14, Sep. 2007.

* cited by examiner

FIG. 4B

LIST OF REASONS FOR VM-EXIT ON IA-32 (VT-X) CPU

| VM-EXIT REASON | DESCRIPTION | DETERMINATION | | CONDITION OF NOTIFYING GUEST VMM OF VM-EXIT |
|---|---|---|---|---|
| | | VM-EXIT CAUSED BY ISSUE OF VM-ENTRY INSTRUCTION | VM-EXIT CAUSED BY ISSUE OF VMCLEAR INSTRUCTION | |
| 0 | EXCEPTION OR NON-MASKABLE INTERRUPT(NMI) | | | DEPENDING ON SETTING IN GUEST VMCS(*1) |
| 1 | EXTERNAL INTERRUPT | | | O |
| 2 | TRIPLE FAULT | | | O |
| 3 | INIT SIGNALED | | | O |
| 4 | START-UP IPI (SIPI) | | | O |
| 5 | SMI | | | O |
| 6 | OTHER SMI | | | O |
| 7 | INTERRUPT WINDOW | | | DEPENDING ON SETTING IN GUEST VMCS(*1) |
| 9 | TASK SWITCH | | | O |
| 10 | CPUID | | | O |
| 12 | HLT | | | DEPENDING ON SETTING IN GUEST VMCS(*1) |
| 13 | INVD | | | O |
| 14 | INVLPG | | | DEPENDING ON SETTING IN GUEST VMCS(*1) |
| 15 | RDPMC | | | DEPENDING ON SETTING IN GUEST VMCS(*1) |
| 16 | RDTSC | | | DEPENDING ON SETTING IN GUEST VMCS(*1) |
| 17 | RSM | | | O |
| 18 | VMCALL | | | O |
| 19 | VMCLEAR | | O | |

(*1) CONDITIONS OF NOTICE VARY DEPENDING ON SET VALUES OF VM EXECUTION CONTROL FIELD OR THE LIKE IN GUEST VMCS.

EXIT REASON

LIST OF REASONS FOR VM-EXIT ON IA-32 (VT-X) CPU

| VM-EXIT REASON | DESCRIPTION | DETERMINATION | | CONDITION OF NOTIFYING GUEST VMM OF VM-EXIT |
|---|---|---|---|---|
| | | VM-EXIT CAUSED BY ISSUE OF VM-ENTRY INSTRUCTION | VM-EXIT CAUSED BY ISSUE OF VMCLEAR INSTRUCTION | |
| 20 | VMLAUNCH | ○ | | |
| 21 | VMPTRLD | | | ○ |
| 22 | VMPTRST | | | ○ |
| 23 | VMREAD | | | ○ |
| 24 | VMRESUME | ○ | | |
| 25 | VMWRITE | | | ○ |
| 26 | VMXOFF | | | ○ |
| 27 | VMXON | | | ○ |
| 28 | CR REGISTER ACCESS | | | DEPENDING ON SETTING IN GUEST VMCS(*1) |
| 29 | MOV DR | | | DEPENDING ON SETTING IN GUEST VMCS(*1) |
| 30 | I/O INSTRUCTION | | | DEPENDING ON SETTING IN GUEST VMCS(*1) |
| 31 | RDMSR | | | DEPENDING ON SETTING IN GUEST VMCS(*1) |
| 32 | WRMSR | | | DEPENDING ON SETTING IN GUEST VMCS(*1) |
| 33 | VM-ENTRY FAILURE DUE TO INVALID GUEST STATE | | | ○ |
| 34 | VM-ENTRY FAILURE DUE TO MSR LOADING | | | ○ |
| 36 | MWAIT | | | DEPENDING ON SETTING IN GUEST VMCS(*1) |
| 39 | MONITOR | | | DEPENDING ON SETTING IN GUEST VMCS(*1) |
| 40 | PAUSE | | | DEPENDING ON SETTING IN GUEST VMCS(*1) |
| 41 | VM-ENTRY FAILURE DUE TO MACHINE CHECK | | | ○ |
| 43 | TPR BELOW THRESHOLD | | | DEPENDING ON SETTING IN GUEST VMCS |

(*1) CONDITIONS OF NOTICE VARY DEPENDING ON SET VALUES OF VM EXECUTION CONTROL FIELD OR THE LIKE IN GUEST VMCS.

EXIT REASON

FIG. 4C

EXAMPLE OF USER INTERFACE SCREEN (ENABLING/DISABLING VIRTUALIZATION FEATURE)

| Virtual Server Feature Setting | | |
|---|---|---|
| Feature#0 | Feature#1 | Virtualization Feature |

| VM# | Present Setting | New Setting |
|---|---|---|
| 0 | ON | ON |
| 1 | OFF | ON |
| 2 | OFF | OFF |
| 3 | OFF | OFF |

[ OK ]  [ Discard ]

LIST OF REASONS FOR #VMEXIT ON AMD-64 (AMD-V) CPU

| EXITCODE | NAME | DETERMINATION | |
|---|---|---|---|
| | | #VMEXIT CAUSED BY ISSUE OF VMRUN INSTRUCTION | CONDITION OF NOTIFYING GUEST VMM OF #VMEXIT |
| 0-15 | VMEXIT_CR[0-15]_READ | | DEPENDING ON SETTING IN GUEST VMCB(*2) |
| 16-31 | VMEXIT_CR[0-15]_WRITE | | DEPENDING ON SETTING IN GUEST VMCB(*2) |
| 32-47 | VMEXIT_DR[0-15]_READ | | DEPENDING ON SETTING IN GUEST VMCB(*2) |
| 48-63 | VMEXIT_DR[0-15]_WRITE | | DEPENDING ON SETTING IN GUEST VMCB(*2) |
| 64-95 | VMEXIT_EXCP[0-31] | | DEPENDING ON SETTING IN GUEST VMCB(*2) |
| 96 | VMEXIT_INTR | | DEPENDING ON SETTING IN GUEST VMCB(*2) |
| 97 | VMEXIT_NMI | | DEPENDING ON SETTING IN GUEST VMCB(*2) |
| 98 | VMEXIT_SMI | | DEPENDING ON SETTING IN GUEST VMCB(*2) |
| 99 | VMEXIT_INIT | | DEPENDING ON SETTING IN GUEST VMCB(*2) |
| 100 | VMEXIT_VINTR | | DEPENDING ON SETTING IN GUEST VMCB(*2) |
| ... | ... | ... | ... |

(*2) CONDITIONS OF NOTICE VARY DEPENDING ON SET VALUES OF INTERCEPTION CONTROL BITS OR THE LIKE IN GUEST VMCB

*FIG. 11B*

LIST OF REASONS FOR #VMEXIT ON AMD-64 (AMD-V) CPU

| EXITCODE 1371 | NAME 1372 | DETERMINATION 1373 #VMEXIT CAUSED BY ISSUE OF VMRUN INSTRUCTION | 1374 CONDITION OF NOTIFYING GUEST VMM OF #VMEXIT |
|---|---|---|---|
| 128 | VMEXIT_VMRUN | O | DEPENDING ON SETTING IN GUEST VMCB(*2) |
| 129 | VMEXIT_VMMCALL | | DEPENDING ON SETTING IN GUEST VMCB(*2) |
| 130 | VMEXIT_VMLOAD | | DEPENDING ON SETTING IN GUEST VMCB(*2) |
| 131 | VMEXIT_VMSAVE | | DEPENDING ON SETTING IN GUEST VMCB(*2) |
| ... | ... | | ... |
| 136 | VMEXIT_ICEBP | | DEPENDING ON SETTING IN GUEST VMCB(*2) |
| 1024 | VMEXIT_NPF | | O |
| -1 | VMEXIT_INVALID | | O |

(*2) CONDITIONS OF NOTICE VARY DEPENDING ON SET VALUES OF INTERCEPTION CONTROL BITS OR THE LIKE IN GUEST VMCB

FIG. 11C

| HANDOFF CAUSE | DESCRIPTION | DETERMINATION VIRTUALIZATION FAULT CAUSED BY PAL_VPS_RESUME PROCEDURE CALL | CONDITION OF NOTIFYING GUEST VMM OF VIRTUALIZATION FAULT |
|---|---|---|---|
| 1 | DUE TO MOV-TO-AR INSTRUCTION. | | O |
| 2 | DUE TO MOV-TO-AR-IMM INSTRUCTION. | | O |
| 3 | DUE TO MOV-FROM-AR INSTRUCTION. | | O |
| 4 | DUE TO MOV-TO-CR INSTRUCTION. | | DEPENDING ON SETTING IN GUEST VDC FIELD(*4) |
| 5 | DUE TO MOV-FROM-CR INSTRUCTION. | | DEPENDING ON SETTING IN GUEST VDC FIELD(*4) |
| 6 | DUE TO MOV-TO-PSR INSTRUCTION. | | O |
| 7 | DUE TO MOV-FROM-PSR INSTRUCTION. | | O |
| 8 | DUE TO ITC.D INSTRUCTION. | | O |
| 9 | DUE TO ITC.I INSTRUCTION. | | O |
| 10 | DUE TO MOV-TO-RR INSTRUCTION. | | O |
| 11 | DUE TO MOV-TO-DBR INSTRUCTION. | | DEPENDING ON SETTING IN GUEST VDC FIELD(*4) |
| 12 | DUE TO MOV-TO-IBR INSTRUCTION. | | DEPENDING ON SETTING IN GUEST VDC FIELD(*4) |
| 13 | DUE TO MOV-TO-PKR INSTRUCTION. | | O |
| 14 | DUE TO MOV-TO-PMC INSTRUCTION. | | DEPENDING ON SETTING IN GUEST VDC FIELD(*4) |
| 15 | DUE TO MOV-TO-PMD INSTRUCTION. | | DEPENDING ON SETTING IN GUEST VDC FIELD(*4) |
| 16 | DUE TO ITR.D INSTRUCTION. | | O |
| 17 | DUE TO ITR.I INSTRUCTION. | | O |
| 18 | DUE TO MOV-FROM-RR INSTRUCTION. | | O |
| 19 | DUE TO MOV-FROM-DBR INSTRUCTION. | | DEPENDING ON SETTING IN GUEST VDC FIELD(*4) |

(*4) NOTICE CONDITION VARIES DEPENDING ON CONDITION OF RESTRICTION ON GENERATION OF VIRTUALIZATION FAULT SPECIFIED IN GUEST VDC FIELD.
GUEST VDC FIELD IS DATA STRUCTURE HOLDING INFORMATION ON VIRTUALIZATION ACCELERATION 0CONTROL (VAC) FIELD DEFINED BY VT-I SPEC. REFER TO VT-I SPEC FOR MORE DETAIL.
LIST OF REASONS FOR VIRTUALIZATION FAULT ON IPF (VT-I) CPU

| VIRTUALIZATION FAULT REASON | | | |
|---|---|---|---|
| HAND OFF CAUSE (1331) | DESCRIPTION (1332) | DETERMINATION (1333) VIRTUALIZATION FAULT CAUSED BY PAL, VPS RESUME PROCEDURE CALL | CONDITION OF NOTIFYING GUEST VMM OF VIRTUALIZATION FAULT (1334) |
| 20 | DUE TO MOV-FROM-IBR INSTRUCTION. | | DEPENDING ON SETTING IN GUEST VDC FIELD(*4) |
| 21 | DUE TO MOV-FROM-PKR INSTRUCTION. | | O |
| 22 | DUE TO MOV-FROM-PMC INSTRUCTION. | | DEPENDING ON SETTING IN GUEST VDC FIELD(*4) |
| 23 | DUE TO MOV-FROM-CPUID INSTRUCTION. | | O |
| 24 | DUE TO SSM INSTRUCTION. | | DEPENDING ON SETTING IN GUEST VDC FIELD(*4) |
| 25 | DUE TO RSM INSTRUCTION. | | DEPENDING ON SETTING IN GUEST VDC FIELD(*4) |
| 26 | DUE TO PTC.L INSTRUCTION. | | O |
| 27 | DUE TO PTC.G INSTRUCTION. | | O |
| 28 | DUE TO PTC.GA INSTRUCTION. | | O |
| 29 | DUE TO PTR.D INSTRUCTION. | | O |
| 30 | DUE TO PTR.I INSTRUCTION. | | O |
| 31 | DUE TO THASH INSTRUCTION. | | O |
| 32 | DUE TO TTAG INSTRUCTION. | | O |
| 33 | DUE TO TPA INSTRUCTION. | | O |
| 34 | DUE TO TAK INSTRUCTION. | | O |
| 35 | DUE TO PTC.E INSTRUCTION. | | O |
| 36 | DUE TO COVER INSTRUCTION. | | O |
| 37 | DUE TO RFI INSTRUCTION. | | O |
| 38 | DUE TO BSW.0 INSTRUCTION. | | O |
| 39 | DUE TO BSW.1 INSTRUCTION. | | O |
| 40 | DUE TO VMSW INSTRUCTION. | O (*3) | DEPENDING ON SETTING IN GUEST VDC FIELD(*4) |

(*4) NOTICE CONDITION VARIES DEPENDING ON CONDITION OF RESTRICTION ON GENERATION OF VIRTUALIZATION FAULT SPECIFIED IN GUEST VDC FIELD.
GUEST VDC FIELD IS DATA STRUCTURE HOLDING INFORMATION ON VIRTUALIZATION ACCELERATION 0CONTROL (VAC) FIELD DEFINED BY VT-I SPEC.     REFER TO VT-I SPEC FOR MORE DETAIL.
LIST OF REASONS FOR VIRTUALIZATION FAULT ON IPF (VT-I) CPU

METHOD FOR CONTROLLING A VIRTUAL MACHINE AND A VIRTUAL MACHINE SYSTEM

CLAIM OF PRIORITY

This application is a continuation of U.S. patent application Ser. No. 12/213,287, filed Jun. 17, 2008, which claims priority from Japanese application P2007-164892 filed on Jun. 22, 2007, the content of which is hereby incorporated by reference into this application.

BACKGROUND OF THE INVENTION

This invention relates to a virtual computer system, and more particularly, to a virtual computer system using a processor provided with a virtualization support feature.

Recently, as open servers have become popular, a large number of servers have been introduced to information systems used in enterprises. Especially, indiscriminate introduction of Intel Architecture (IA)-32 servers, which have high cost performance, has increased the operation/management cost of servers including the cost of power consumption and the cost of hardware maintenance, and is posing a problem for the enterprises which are operating the servers.

A server integration which, in order to reduce the operation/management cost of servers, unifies a plurality of servers into one physical server is promising. As a method for realizing the server integration, a virtualization software program which provides a feature of virtualizing computer resources is attracting attention. The virtualization software program is a control software program, which divides computer resources such as the CPU (processor) and I/O's of a single physical server, and assigns the divided computer resources to a plurality of virtual servers. On the respective virtual servers, one OS (guest OS) can operate. By employing the virtualization software program, it is possible to realize the server integration which assigns OS's and application programs, which conventionally run on a plurality of physical servers, to respective virtual servers, thereby providing a plurality of servers on a single computer.

A description will now be given of a policy of the virtualization software program for assigning computer resources to virtual servers. For the assignment of the CPU as the computer resource, virtualization software programs for the IA-32 mainly employ a processor provided with the virtualization support feature such as Virtualization Technology for Xenon (VT-x) (or AMD-V). The VT-x is a feature which assigns different operation privileges to a virtualization software program and a guest OS, and is implemented as hardware of a processor, as shown in JP 2005-529401 A, Intel Corp., "Intel 64 and IA-32 Architectures Software Developer's Manual VOL 2B", retrieved on May 1 from www.intel.com, 2007, and Advanced Micro Devices, Inc., "AMD-Virtualization (AMD-V)", retrieved on May 1, 2007 from www.amd.com, for example. A CPU compliant with the VT-x feature detects the operation privilege passed between the guest OS's and the virtualization software program, and backs up and restores a register status of the CPU, thereby providing independent operation environments for respective virtual servers. It should be noted that Intel, Itanium, Xenon, and AMD are registered trademarks.

On the other hand, a policy of the assignment of I/O's depends on virtualization software programs. The assignments of the I/O's by the virtualization software programs are generally classified into:

1. Direct I/O assignment type which permits direct use of I/O devices of a physical server; and
2. Virtual I/O assignment type which hides types and revisions of I/O devices of a physical server.

The "1. Direct I/O assignment type" has an advantage that, for presently operating I/Os of a physical server, a server integration can be easily realized without rebuilding a file system or the like. On the other hand, the "2. Virtual I/O assignment type" has an advantage that a certain I/O configuration can be provided for guest OS's independently of I/O types of a physical server.

The following are known examples of the virtualization software programs described above. First, as a virtualization software program for an IA-32 server, ESX Server of VMware (registered trademark) is known. The ESX Server can cause a plurality of conventional OS's to operate on a physical server employing an IA-32 CPU providing the above-mentioned VT-x feature.

As a virtualization software program based on a mainframe computer technology, a logical partition operation feature (in IBM System 370, for example) is known. This feature partitions a single physical computer into a plurality of logical partitions (LPAR's), and causes a conventional OS and a virtual machine manager (VMM) to operate on the respective LPAR's. According to the logical partition operation feature, the mainframe (physical computer) uses a feature (LPAR mode) corresponding to the above-mentioned VT-x of IA-32 to cause the conventional OS and the VMM to run on the virtual server (LPAR).

Moreover, SimOS is documented at simos.stanford.edu and is known as a virtualization software program which provides the VT-x feature of the IA-32 by means of a simulator. A simulator of this type is a software program which provides functions of an arbitrary server and CPU by interpreting an instruction sequence of a guest OS on a virtual server.

Moreover, as a virtualization support feature implemented on an IA-64 processor (IPF: Itanium Processor Family), the VT-i feature described parts §3.3.2 ("Processor Status Register"), §3.4 ("Processor Virtualization"), §11.7 ("PAL Virtualization Support"), of Intel Corp., "Intel Itanium Architecture Software Developer's Manual", vol. 2, is known.

SUMMARY OF THE INVENTION

Considering the recent needs for the server integration, it has been studied to integrate the virtualization software feature of the "2. Virtual I/O assignment type" to a next-generation server OS such as Windows Server Longhorn and Windows Server 2008.

However, the conventional virtualization software program has the following problems.

Though the conventional virtualization software program such as the ESX Server can cause a conventional OS to run on a plurality of virtual servers based on the virtualization support feature (VT-x) of a CPU constituting a physical computer, the conventional virtualization software program cannot provide the virtual server with the VT-x feature. Therefore, the ESX Server has a problem that, on the ESX server, an OS incorporating a virtualization software program (virtualization feature) such as the next generation server OS is hard to execute.

Moreover, according to the logical partition operation feature, an OS or a VMM on an LPAR cannot use the LPAR mode. Therefore, there poses a problem that an OS incorporating the virtualization software program is hard to operate on an LPAR.

Further, the above-mentioned simulator can provide a virtual server with the VT-x feature, thereby causing the next generation OS incorporating the virtualization software program to operate. However, since the simulator interprets an instruction sequence of a virtual server (guest OS), and converts it into an instruction sequence executable on a CPU of a physical computer (carries out a binary translation), resulting in a generation of an overhead, and a decrease in performance (processing performance) of the virtual server, it is not practical for the simulator to carry out the server integration which requires operation of a plurality of virtual servers.

Moreover, though a next generation OS incorporating a virtualization feature of the virtual I/O assignment type is suitable for an application for generating a large number of virtual servers having the same I/O configuration such as an application for providing a development environment, the next generation OS is not suitable for an application for integrating conventional OS's operating on existing servers (OS without using the VT-x feature such as NT servers). Especially, software assets presently operated by enterprises are mostly software programs operating on OS's without a virtualization feature. Therefore, in a future server integration process, a server integration environment in which existing OS's without a virtualization feature and newly-introduced next-generation OS's with a virtualization feature coexist is necessary. However, as described above, there has been the conventional problem that it is difficult to integrate next-generation OS's incorporating a virtualization feature on a virtual computer, and to integrate next-generation OS's and conventional OS's.

In view of the above-mentioned problems, it is an object of this invention to provide a virtual computer which can run an OS incorporating a virtualization feature on a virtual server without decreasing a performance of the virtual computer, and it is another object of this invention to integrate next generation OS's incorporating a virtualization feature and conventional OS's without a virtualization feature on a signal physical computer.

According to one aspect of this invention, a recording medium is stored with a virtualization program for providing a plurality of virtual processors, which is executed by a physical computer including a physical processor and a memory. The virtualization program causes the physical processor to execute the procedures of: generating, by the first virtual machine manager, a first virtual processor;

generating, by a second virtual machine manager executed on the first virtual processor, a second virtual processor;

executing, by the second virtual processor, a user program;

receiving, by the first virtual machine manager, a call for the first virtual machine manager from the physical processor;

analyzing, by the first virtual machine manager, a cause of the call for the first virtual machine manager;

determining, by the first virtual machine manager, based on a result of the analyzing, which of the second virtual machine manager and the user program to execute; and instructing, by the first virtual machine manager, based on a result of the determining, the first virtual processor to execute one of the second virtual machine manager and the user program.

According to another aspect of this invention, a method of providing a plurality of virtual processors, which is carried out by a physical computer including a physical processor and a memory, includes the steps of:

generating, by a first virtual machine manager, a first virtual processor;

generating, by a second virtual machine manager executed on the first virtual processor, a second virtual processor;

executing, by the second virtual processor, a user program;

receiving, by the first virtual machine manager, a call for the first virtual machine manager from the physical processor;

analyzing, by the first virtual machine manager, a cause of the call for the first virtual machine manager;

determining, by the first virtual machine manager, based on a result of the analyzing, which of the second virtual machine manager and the user program to execute; and instructing, by the first virtual machine manager, based on a result of the determining, the first virtual processor to execute one of the second virtual machine manager and the user program.

Therefore, according to this invention, in response to the call for the first virtual machine manager, by selecting one of the first control information used for executing the user program on the second virtual processor and the second control information used for executing the second virtual machine manager, and by updating third control information with the selected control information, it is possible to execute a next-generation OS with a virtualization feature as a user program on the first virtual processor. Moreover, since switching between the user program and the second virtual machine manger can be carried out by updating the third control information with the first or second control information, it is possible to operate the next-generation OS without a decrease in performance of the virtual computer.

Then, a conventional OS without the second virtual machine manager and a next generation OS with the second virtual machine manager can be integrated on a single physical computer.

BRIEF DESCRIPTION OF THE DRAWINGS

FIG. 4B is a diagram showing an example of a list of the reasons of the VM-exit according to the first embodiment.

FIG. 4C is a diagram showing an example of a list of the reasons of the VM-exit according to the first embodiment.

FIG. 8 is a screen image showing a user interface used for enabling/disabling the virtualization feature for each virtual server according to a first embodiment of this invention.

FIG. 11B is a diagram showing an example of the list of the reasons for the #VMEXIT according to a second embodiment of this invention.

FIG. 11C is a diagram showing an example of the list of the reasons for the #VMEXIT according to a second embodiment of this invention.

FIG. 15B is an explanatory diagram showing an example of the list of reasons for the virtualization fault according to a third embodiment of this invention.

FIG. 15C is an explanatory diagram showing an example of the list of reasons for the virtualization fault according to a third embodiment of this invention.

DETAILED DESCRIPTION OF THE PREFERRED EMBODIMENTS

A description will now be given of embodiments of this invention with reference to accompanying drawings.
(First Embodiment)

Figure 1:
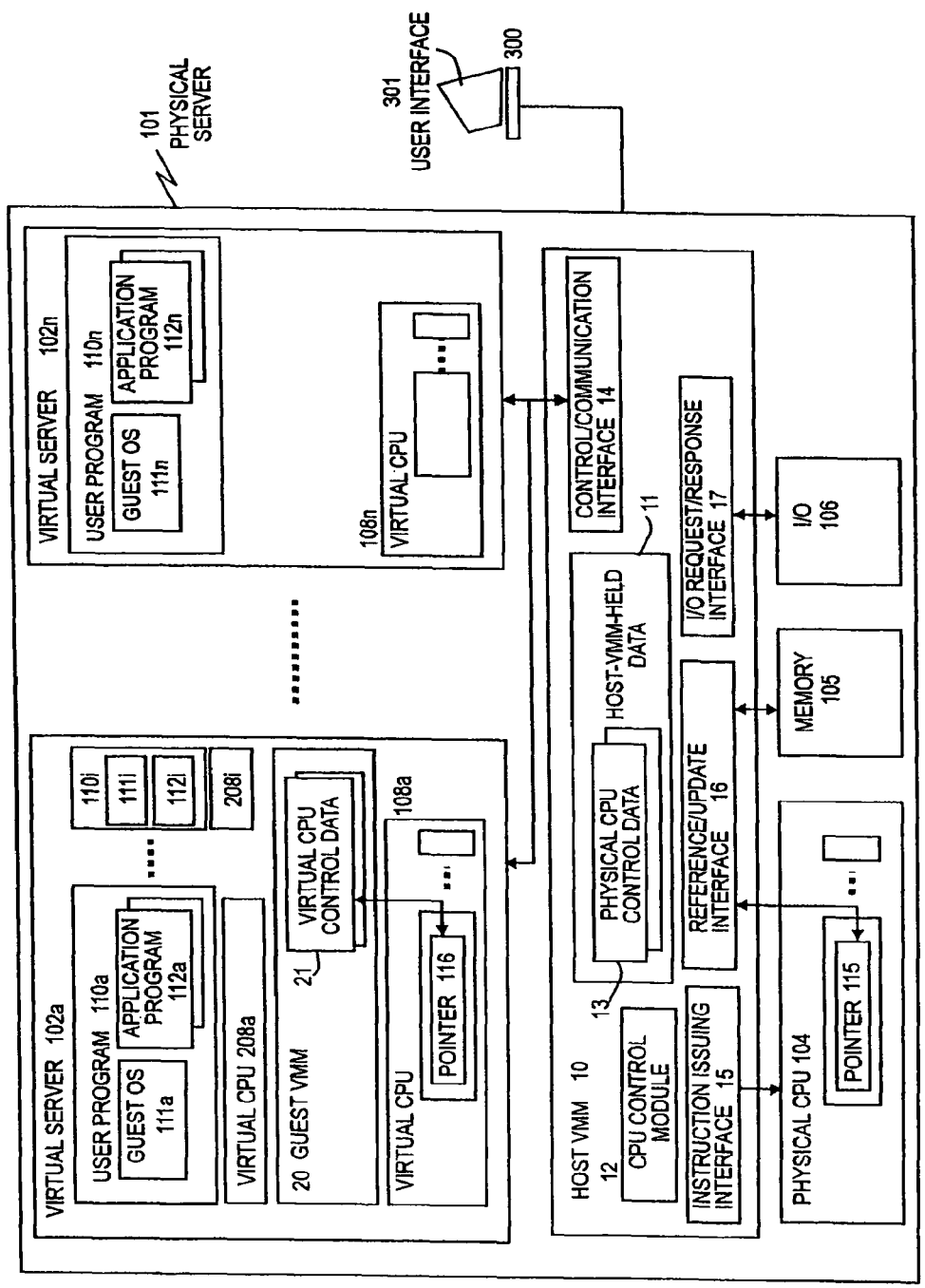
FIG. 1 is a block diagram of a virtual computer system according to a first embodiment of this invention.

FIG. 1 shows a first embodiment, and is a block diagram of a virtual computer system to which this invention is applied. A physical server (physical computer) 101 is constructed by a physical CPU (processor) 104 provided with a virtualization support feature for carrying out arithmetic operations, a memory 105 for storing data and programs, and an I/O device 106 for transmitting/receiving data to/from devices external to the physical server 101. It should be noted that the I/O device 106 is constructed by a network interface, host bus adaptor, and the like. Moreover, the physical CPU 104 may be constructed by a plurality of CPUs or by a CPU provided with a plurality of processing cores. Moreover, the virtualization support feature (virtual machine extensions: VMX) of the physical CPU 104 includes the above-mentioned virtualization technology for IA-32 processors (VT-x), the AMD virtualization technology (AMD-V), or the virtualization technology for Itanium architecture processors (VT-i). It should be noted that an operation mode using the VMX is a VMX mode, and an operation mode without using the VMX on a normal privilege level is a normal operation mode.

On the physical server 101, in order to operate a plurality of virtual servers 102a to 102n, a host virtual machine manager (VMM) 10 is executed for converting physical computer resources of the physical server 101 into virtualized computer resources, and assigning the virtualized computer resources to the respective virtual servers 102a to 102n. This host VMM 10 is provided as a program which is read to the memory 105 and then executed by the physical CPU 104. The host VMM 10 provides the respective virtual servers 102a to 102n with virtual CPU's 108a to 108n, and assigns the memory 105 and the I/O device 106 to the respective virtual servers 102a to 102n. A well-known or publicly-known method may be properly used for assigning the computer resources of the physical server 101 to the respective virtual servers 102a to 102n, and hence, a detailed description thereof is omitted.

The physical server 101 is coupled to a management console 300 providing a user interface 301, and an administrator or the like enters setting such as allocations of the computer resources or the like to the host VMM 10 via the user interface 301. Moreover, the user interface 301 outputs setting statuses received from the host VMM 10 and the like on a display device of the management console 300.

On the virtual servers 102a to 102n running on the host VMM 10 of the physical server 101, guest OS's 111a to 111n are respectively running as user programs 110a to 110n, and on the respective guest OS's 111a to 111n, application programs 112a to 112n are respectively executed. The OS's 111a to 111n are respectively executed on the virtual CPU's 108a to 108n provided by the host VMM 10. It should be noted that the virtual CPU's 108a to 108n allow assignment of a plurality of virtual CPU's to a single virtual server.

Then, on the virtual server 102a, a next-generation OS incorporating a virtualization feature (guest VMM 20) as the guest OS 111a is running, and on the virtual server 102n, a conventional OS (such as the NT Server) without using a virtualization feature as the guest OS 111n is running.

The host VMM 10 assigns the virtual CPU 108n and computer resources set via the management console 300 to the virtual server 102n executing the conventional OS, thereby executing the guest OS 111n and the application program 112n.

On the other hand, the host VMM 10 provides the virtual CPU 108a to be assigned to the virtual server 102a executing the next-generation OS with the virtualization support feature. On the virtual CPU 108a, the guest VMM (second virtual machine manager) 20 is running, and this guest VMM 20 provides virtual CPU's 208a to 208i. On the virtual server 102a on which the next-generation OS is running, on the first virtual CPU 108a, the plurality of second virtual CPU's 208a to 208i are provided, and, on the respective virtual CPU's 208a to 208i, the plurality of user programs 110a (guest OS 111a and application program 112a) to 110i (guest OS 111i and application program 112i) are executed.

In the following section of this first embodiment, a description will be given of an example in which the physical CPU 104 has the VT-x feature, and the guest OS 111a of the virtual server 102a is the next-generation OS incorporating the virtualization feature.

Figure 2:
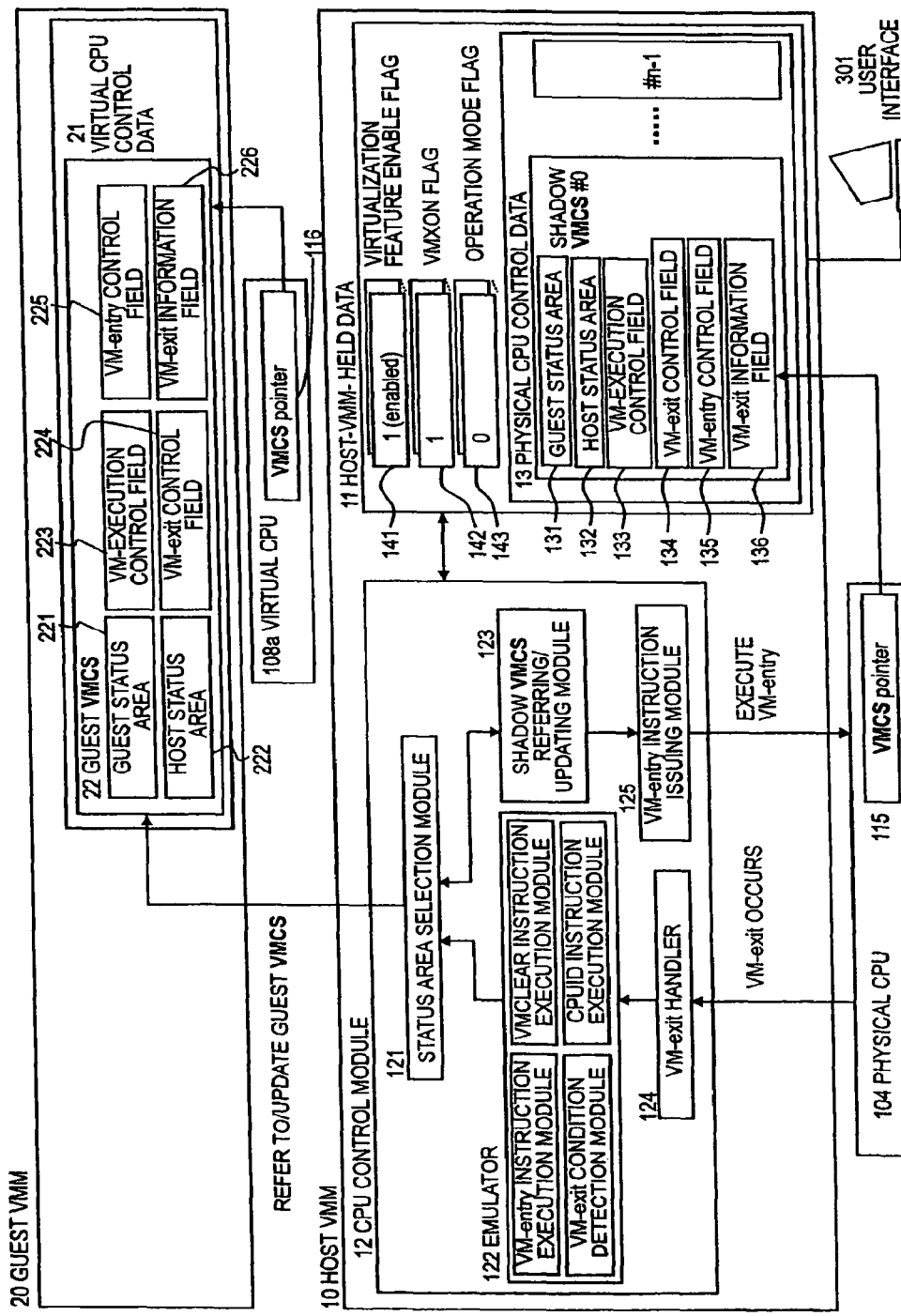
FIG. 2 is a block diagram showing functions of the host VMM according to a first embodiment of this invention.

The host VMM 10 using the VT-x feature stores host-VMM-held data 11 for storing statuses of the virtual servers 102a to 102n and control information used for controlling the physical CPU 104 in a predetermined area of the memory 105. Then, in the host-VMM-held data 11, physical CPU control data 13 used for controlling the physical CPU 104 is stored. The physical CPU control data 13 is a data structure representing statuses of the virtual CPU's 108a to 108n using the virtualization support feature, and is referred to as virtual machine control block (VMCB) or virtual machine control structure (VMCS). According to this embodiment, as shown in FIG. 2, the physical CPU control data 13 in the host-VMM-held data 11 are shadow VMCS's #0 to #n−1, virtual CPU control data 21 handled by the guest VMM 20 are a guest VMCS, and the shadow VMCS's and the guest VMCS are distinguished from each other. Moreover, the physical CPU 104 has a pointer 115 used to refer to the shadow VMCS's #0 to #n−1 in the physical CPU control data 13.

The host VMM 10 sets an operation mode of the physical CPU 104 to one of an operation mode (VMX non-root mode) for executing the user program 110a or the guest VMM 20 and an operation mode (VMX root mode) for executing the host VMM 10 by rewriting the shadow VMCS's #0 to #n−1 in the physical CPU control data 13.

On the virtual server 102a, the virtualization feature (virtualization software program) integrated into the guest OS 111a, which is the next-generation OS, runs as the guest VMM 20 on the virtual CPU 108a provided by the host VMM 10. The guest VMM 20 stores the virtual CPU control data 21 containing the VMCS (guest VMCS 22) used for controlling the virtualization support feature of the virtual CPU 108a. The guest VMCS 22 is stored in a predetermined area of the memory 105 assigned by the host VMM 10.

Moreover, the virtual CPU 108a has a pointer 116 used to refer to the virtual CPU control data 21 (guest VMCS 22) of the guest VMM 20. This pointer 116 is a pointer pointing to the control data structure (guest VMCS 22) of the virtual CPU 108a corresponding to the VT-x feature held by the guest OS 111a, and is initialized when a VMPTRLD instruction is issued by the guest OS 111a. It should be noted that the pointer 116 is initialized by the guest VMM 20.

In FIG. 1, the virtual CPU's 208a to 208i of the virtual server 102a on which the next-generation OS is running are provided by the guest VMM 20 integrated into the next-generation OS, and the user programs 110a to 110i can be executed on the respective virtual CPU's 208a to 208i. It should be noted that the guest VMM 20 of the virtual server 102a may serve as an add-in software program of the guest OS 111a.

(Overview of this Invention)

The VT-x feature for supporting the virtualization controls the operation mode of the physical CPU 104 by using the shadow VMCS's secured by the host VMM 10 on the memory 105 of the physical server 101. The physical CPU 104 having the VT-x feature as the virtualization support feature has the normal operation mode and the virtual machine extensions (VMX) mode for providing the virtualization support feature, and, in the VMX mode, switches the mode either to the host mode (hereinafter, VMX root mode) in which the host VMM 10 operates, or to the guest mode (hereinafter, VMX non-root mode) in which the guest VMM 20 or the user program (guest OS 111a or the application program 112a) operates.

The shadow VMCS of the physical CPU control data 13 has only one type of field (guest status area 131) specifying the operation status of the user program 110a on the virtual server 102a, which does not make it possible to simply distinguish which of the guest VMM 20, which is the virtualization feature of the next-generation OS, and the user program 110a (guest OS 111a or application program 112a) is operating.

This invention focuses on a fact that the single virtual CPU does not execute the guest VMM 20 and the user program 110a at the same time, the host VMM 10 monitors the switch between the guest VMM 20 and the user program 110a of the virtual server 102a executing the guest OS 111a incorporating the virtualization function, thereby rewriting the guest status area 131 of the shadow VMCS's #0 to #n−1 of the host-VMM-held data 11 in switching the operation mode, and causing the virtualization feature to operate on the virtual server 102a.

Therefore, the host VMM 10 monitors the guest OS 111a, which is the next-generation OS incorporating the virtualization feature, switches the operation mode of the physical CPU 104 between the VMX root mode in which the host VMM 10 operates and the VMX non-root mode in which the guest VMM 20 or the user program 110a operates, and emulates instructions of the guest VMM 20 or the guest OS under a predetermined condition (VM-exit) in the VMX root mode. As a result, for the guest OS 111a, it appears that the virtual CPU 108a is providing the virtualization support feature.

(Configuration of Host VMM)

The VMM 10 includes, in addition to the host-VMM-held data 11 described above, a CPU control module 12 which monitors the virtual servers 102a to 102n and switches the operation mode of the physical CPU 104 to one of the VMX root mode and the VMX non-root mode.

Moreover, the host VMM 10 includes a control/communication interface 14 used by the CPU control module 12 for acquiring the statuses of the virtual servers 102a to 102n, and for transmitting an instruction to the respective virtual servers 102a to 102n, an instruction issuing interface 15 used by the CPU control module 12 for issuing an instruction to the physical CPU 104, a reference/update interface 16 used by the physical CPU 104 for referring to or updating the physical CPU control data 13, and an I/O request/response interface 17 for receiving an interrupt request from the I/O device 106, and responding to the request.

FIG. 2 is a block diagram showing functions of the host VMM 10 and the guest VMM 20. The host VMM 10 sets, in order to use the virtualization support feature (VT-x feature) of the physical CPU 104, the host-VMM-held data 11 in a predetermined area of the memory 105.

The host-VMM-held data 11 is constructed by an area for storing flags indicating use or nonuse of the virtualization support feature of the guest OS's 111a to 111n, and the statuses of the virtual CPU's 108a to 108n, and an area of the physical CPU control data 13 for holding the shadow VMCS's #0 to #n−1 storing the statuses and the like of the respective virtual CPU's 108a to 108n.

The flags of the host-VMM-held data 11 indicating the statuses of the guest OS's and the virtual CPU's include, for example, a virtualization feature enable flag 141 for specifying whether or not each of the guest OS's 111a to 111n can use the virtualization support feature of the physical CPU 104, a VMXON flag 142 for setting whether or not the virtualization support feature is being used by each of the virtual CPU's 108a to 108n, and an operation mode flag 143 for indicating whether the virtualization support feature is operating in one of the VMX root mode and the VMX non-root mode for each of the virtual CPU's 108a to 108n.

The virtualization feature enable flag 141 is set for the respective guest OS's 111a to 111n, is "1" when indicating that the corresponding guest OS can use the virtualization support feature, and is "0" when indicating that the guest OS does not use the virtualization support feature. This virtualization feature enable flag 141 is set to the respective guest OS's 111a to 111n from the management console 300, or is set according to a file specified in advance.

The VMXON flag 142 indicates whether the operation mode of the respective virtual CPU's 108a to 108n is the VMX mode or not, is "1" when indicating that the operation mode of the corresponding virtual CPU's 108a to 108n is the VMX mode, and is "0" when indicating that the operation mode of the corresponding virtual CPU's 108a to 108n is the normal operation mode, in which the virtualization support feature is not used. The VMXON flag 142 is set to "1" by the host VMM 10 when the guest OS's 111a to 111n issue a VMXON instruction, and is reset to "0" by the host VMM 10 when the guest OS's 111a to 111n issue a VMXOFF instruction.

The operation mode flag 143 is used to trace the operation mode of a program running on the virtual CPU's 108a to 108n. This operation mode flag 143 is set to "1" by the host VMM 10 upon a VM-entry of the guest OS's 111a to 111n, and is reset to "0" by the host VMM 10 upon a VM-exit of the guest OS's 111a to 111n. In other words, the operation mode flag 143 indicates, when the VMXON flag 142 is "1", the type of the VMX mode for the respective virtual CPU's 108a to 108n. When the operation mode flag 143 is "0", the virtual CPU's 108a to 108n are in the status (VMX root mode of the virtual CPU's) of executing the guest VMM 20, and when the operation mode flag 143 is "1", the virtual CPU's are in the status (VMX non-root mode of the virtual CPU's 108a to 108n) of executing the user program 110a (guest OS 111a or application program 112a).

The transition between the VMX root mode and the VMX non-root mode in the VMX mode is carried out as described in "Intel 64 and IA-32 Architectures Software Developer's Manual VOL 2B". Thus, only a brief description will now be given thereof. Upon the transition from the normal operation mode to the VMX mode, the host VMM 10 issues the VMXON instruction, thereby switching the operation mode of the physical CPU 104 to the VMX mode. Then, the host VMM 10 in the VMX mode writes information used for executing the user program 110a in the shadow VMCS's #0 to #n–1 of the corresponding CPU's 108a to 108n, issues the VM-entry instruction (VMLAUNCH instruction or VMRESUME instruction), and transitions from the VMX root mode to the VMX non-root mode. This transition from the VMX root mode to the VMX non-root mode is referred to as VM-entry.

Conversely, the transition from the VMX non-root mode to the VMX root mode is referred to as the VM-exit. Upon the VM-exit due to a predetermined reason such as an issue of a privilege instruction of the guest OS's 111a to 111n, the physical CPU 104 notifies the host VMM 10 of the VM-exit. When the CPU control module 12 of the host VMM 10 detects the VM-exit, the CPU control module 12 carries out a predetermined emulation, thereby completing a process of the guest VMM 20 or the guest OS, rewrites the shadow VMCS according to necessity, and issues the VM-entry instruction (first control instruction) to switch the VMX non-root mode to the VMX root mode.

According to this invention, upon the VM-entry of the guest OS 111a, which is the next-generation OS, the host VMM 10 reads a guest status area 221 and a host status area 222 of a guest VMCS 22, and sets a content of one of the areas according to an operation of the guest OS 111a to the guest status area 131 of a shadow VMCS #0, thereby realizing the virtualization feature of the guest OS 111a on the virtual server 102a.

According to the VT-x feature, the switching between the host VMM 10 and the guest VMM 20 or the user program 110a is carried out by the transition between the VM-entry and the VM-exit as described above. Therefore, in order to hold the statuses of the physical CPU 104 or the like before and after the VM-entry and the VM-exit, the shadow VMCS's #0 to #n–1, which are data structures of the physical CPU control data 13, are used.

In the physical CPU control data 13, the respective shadow VMCS's #0 to #n–1 are set for the respective virtual CPU's 108a to 108n, and the respective shadow VMCS's #0 to #n–1 store the following data.

Figure 3:
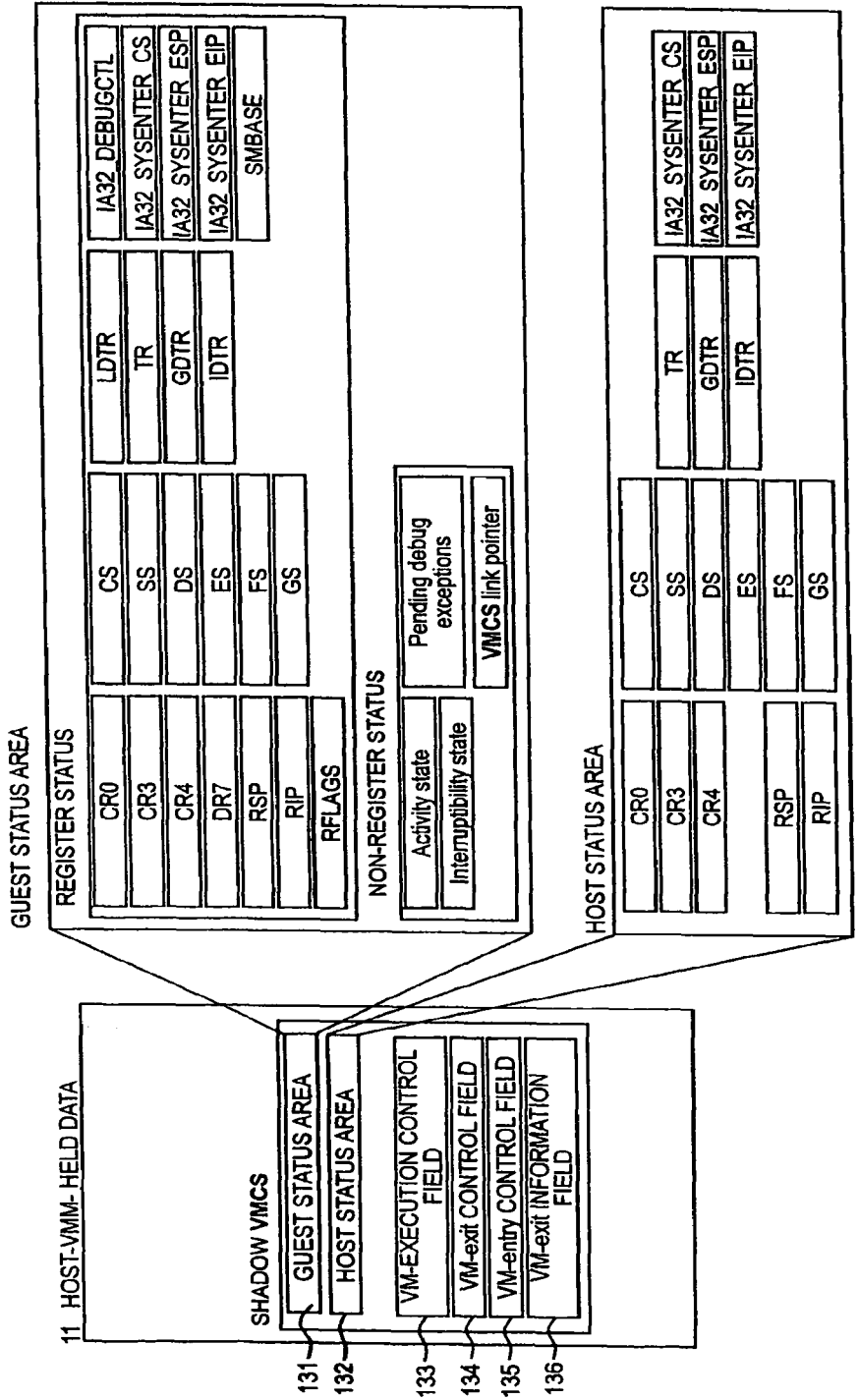
FIG. 3 is a block diagram showing an example of the control data of the shadow VMCS of the host-VMM-held data according to a first embodiment of this invention.

As shown in FIG. 3, the guest status area 131 stores statuses such as a register status of the virtual CPU's 108a to 108n. In other words, as described later, the statuses of the guest VMM 20 or the statuses of the user program 110a are selectively stored.

Figure 4A:
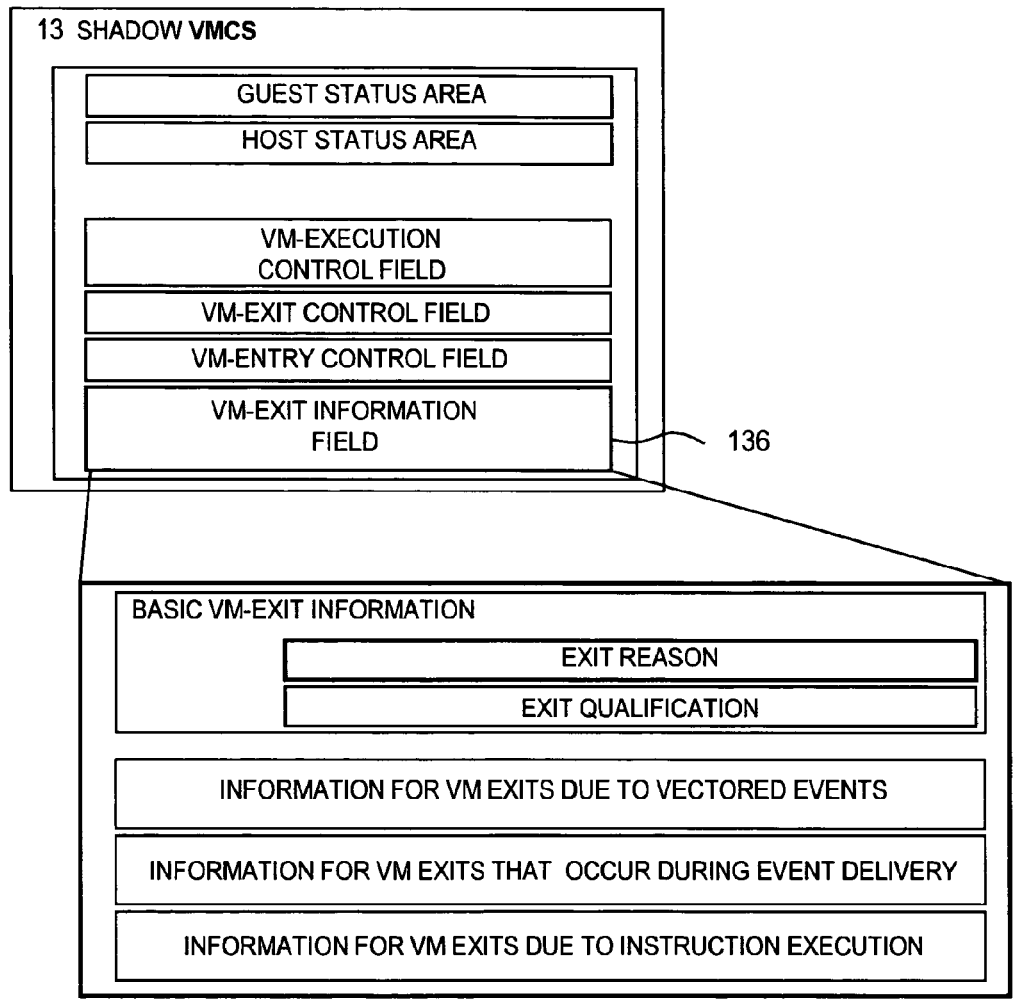
FIG. 4A is a block diagram showing an example of the host VMM held data according to the first embodiment.

As shown in FIG. 3, a host status area 132 stores statuses such as the register status of the physical CPU 104 of the host VMM 10. A VM-execution control field 133 stores setting information of the virtual servers 102a to 102n such as an exception bitmap and an I/O bitmap. A VM-exit control field 134 stores information such as a reason for the VM-exit. A VM-entry control field 135 stores information used for controlling an operation of the VM-entry. A VM-exit information field 136 stores a reason (instruction or event) for generating the VM-exit. As the reason for generating the VM-exit, a reason listed under "description" shown in FIG. 4A, FIG. 4B and FIG. 4C, for example, is set to the VM-exit information field 136. FIG. 3 is a block diagram showing an example of the control data of the shadow VMCS of the host-VMM-held data. FIG. 4A to FIG. 4C are diagram showing an example of a list of the reasons of the VM-exit.

Using the shadow VMCS's #0 to #n–1 as described above, the host VMM 10 controls the respective virtual servers 102a to 102n.

On the other hand, the virtual CPU control data 21 managed by the guest VMM 20 of the virtual server 102a stores the guest VMCS 22 having the same data structure as the shadow VMCS #0 of the above-mentioned physical CPU control data 13.

The guest VMM 20 includes the guest status area 221 for storing statuses such as the register status of the virtual CPU 108a executing the user program 110a (guest OS 111a or application program 112a) and the like, the host status area 222 for storing statuses such as the register status of the virtual CPU 108a executing the guest VMM 20, a VM-execution control field 223 for storing setting information of the virtual server 102a, a VM-exit control field 224 for storing information such as a reason for the VM-exit on the virtual server 102a, a VM-entry control field 225 for storing information used for controlling the operation of the VM-entry on the virtual server 102a, and a VM-exit information area 226 for storing information identifying a reason for the VM-exit on the virtual server 102a.

Similarly to FIG. 3, the guest status area 221 stores the statuses such as the register status of the virtual CPU 108a. In other words, as described later, the statuses of the guest OS 111a or the statuses of the application program 112a are selectively stored.

In the shadow VMCS #0 of the host VMM 10 for controlling the statuses of the virtual server 102a, the guest status area 131 stores the statuses of the VMM 20 or the statuses of the user program 110a (guest OS 111a or application program 112a), and the host status area 132 stores the statuses of the host VMM 10.

On the other hand, in the guest VMCS 22 of the guest VMM 20, the guest status area 221 stores the statuses of the guest OS 111a or the statuses of the application program 112a, and the host status area 222 store the statuses of the guest VMM 20, which is different from the shadow VMCS #0.

A description will now be given of a configuration of the CPU control module 12 of the host VMM 10. The CPU control module 12 includes, in addition to a resource management module (not shown) for assigning the computer resources of the physical server 101 to the respective virtual servers 102a to 102n according to the input from the management console 300 or the like, a status area selection module 121 for selecting, in order to cause the virtualization feature (guest VMM 20) of the guest OS 111a to operate, a source from which the statuses of the virtual CPU are read, an emulator 122, a shadow VMCS referring/updating module 123, a VM-exit handler 124, a VM-entry instruction issuing module 125, and a user interface 301. To the resource management module, as described above, a publicly-known or well-known technology may be applied, and, hence, a detailed description thereof is omitted in this embodiment.

The VM-exit handler 124 receives the VM-exit from the physical CPU 104, and starts the emulator 122.

The emulator 122 identifies an instruction or an event causing the VM-exit received from the VM-exit handler 124 to generate, starts, as described later, a module corresponding to the identified reason for the generation, and carries out a process in place of the guest VMM 20 or the user program 110a.

When the emulator 122 detects a change of the operation mode (switch between the VMX root mode and the VMX non-root mode) of the virtual CPU 108a, the emulator 122 starts a module corresponding to the identified reason (VM-entry instruction execution module, VMCLEAR instruction execution module, CPUID instruction execution module, or VM-exit condition detection module), and starts the status area selection module 121.

As shown in FIG. 4A, FIG. 4B and FIG. 4C, on this occasion, a reason for the generation of the VM-exit is one set to "Exit reason" of the VM-exit information field 136 of the shadow VMCS #0. To the list of the reasons of the VM-exit shown in FIG. 4A, FIG. 4B and FIG. 4C, reasons 1361 caused by the issue of the VM-entry instruction, reasons 1362 caused by the issue of the VMCLEAR instruction (fourth control instruction), and notice conditions 1363 to which an absence/ presence of a VM-exit notice to the guest VMM 20 is set are set in advance.

For example, if the VM-entry instruction (VMLAUNCH instruction or VMRESUME instruction) is detected as a reason for the VM-exit when the operation mode of the virtual CPU 108a is switched, the VM-entry corresponds to the reason 1361 of FIG. 4A, FIG. 4B and FIG. 4C, and, thus, the host VMM 10 carries out the emulation on the VM-entry instruction execution module, thereby carrying out a process in place of the guest VMM 20 or the user program 110a.

If a reason for the VM-exit is a notice condition to the guest VMM 20 corresponding to the notice condition 1363 of FIG. 4A, FIG. 4B and FIG. 4C, the host VMM 10 starts the VM-exit condition detection module and carries out the emulation similarly.

The status area selection module 121 reads the operation mode flag 143 of the virtual CPU (CPU 108a in this example) which has generated the VM-exit from the host-VMM-held data 11, and determines whether the VMX mode is the VMX root mode or the VMX non-root mode. If the operation mode flag 143 is "0", which indicates the VMX root mode, the guest VMM 20 is operating, and, thus, the status area selection module 121 reads the host status area 222 from the guest VMCS 22 of the virtual server (virtual server 102a in this example) which has generated the VM-exit.

On the other hand, if the operation mode flag 143 is "1", which indicates the VMX non-root mode, the user program 110a is operating, and, thus, the status area selection module 121 reads the guest status area 221 from the guest VMCS 22 of the corresponding virtual server 102a.

When the status area selection module 121 has completed the read from the guest VMCS 22, the CPU control module 12 starts the shadow VMCS referring/updating module 123. The shadow VMCS referring/updating module 123 writes the information of the guest VMCS 22 read by the status area selection module 121 in the guest status area 131 of the shadow VMCS #0 corresponding to the virtual CPU 108a, which is subject to the process of the VM-exit, thereby updating the shadow VMCS.

When the guest status area 131 of the shadow VMCS #0 has been completely updated, the CPU control module 12, in order to switch the operation mode of the virtual CPU 108a from the VMX root mode to the VMX non-root mode, updates the operation mode flag 143 to "1", and sets an address of the shadow VMCS #0 of the subject virtual CPU 108a to the pointer 115 of the physical CPU 104.

Then, the CPU control module 12 starts the VM-entry instruction issuing module 125, thereby issuing the VM-entry instruction (VMRESUME instruction) to the physical CPU 104.

When the physical CPU 104 receives the VM-entry instruction, the physical CPU 104 reads the guest status area 131 of the shadow VMCS #0 pointed by the pointer 115, and executes the guest VMM 20 or the user program 110a of the virtual server 102a selected by the status area selection module 121.

As described above, when the guest OS 111a, which is the next-generation OS incorporating the virtualization feature, is operating on the virtual server 102a, and the CPU control module 12 of the host VMM 10 detects the VM-exit of the physical CPU 104, the CPU control module 12 refers to the operation mode flag 143 of the shadow VMCS #0 to determine whether a program executed on the virtual CPU 108a is the guest VMM 20 or the user program 110a. Then, the CPU control module 12, according to the program which has been executed on the virtual CPU 108a, writes a content of the guest status area 221 or the host status area 222 in the guest status area 131 of the shadow VMCS #0 of the host VMM 10, and executes the VM-entry instruction.

In this way, by updating the guest status area 131 of the shadow VMCS #0 held by the host VMM 10 with the information in the guest VMCS 22 held by the guest VMM 20 of the virtual server 102a, it is possible to integrate the virtual server 102a running the guest OS 111a with the virtualization feature and the virtual server 102n executing the conventional OS without the virtualization feature into the single physical server 101.

(Details of Processes by Host VMM)

Figure 5:
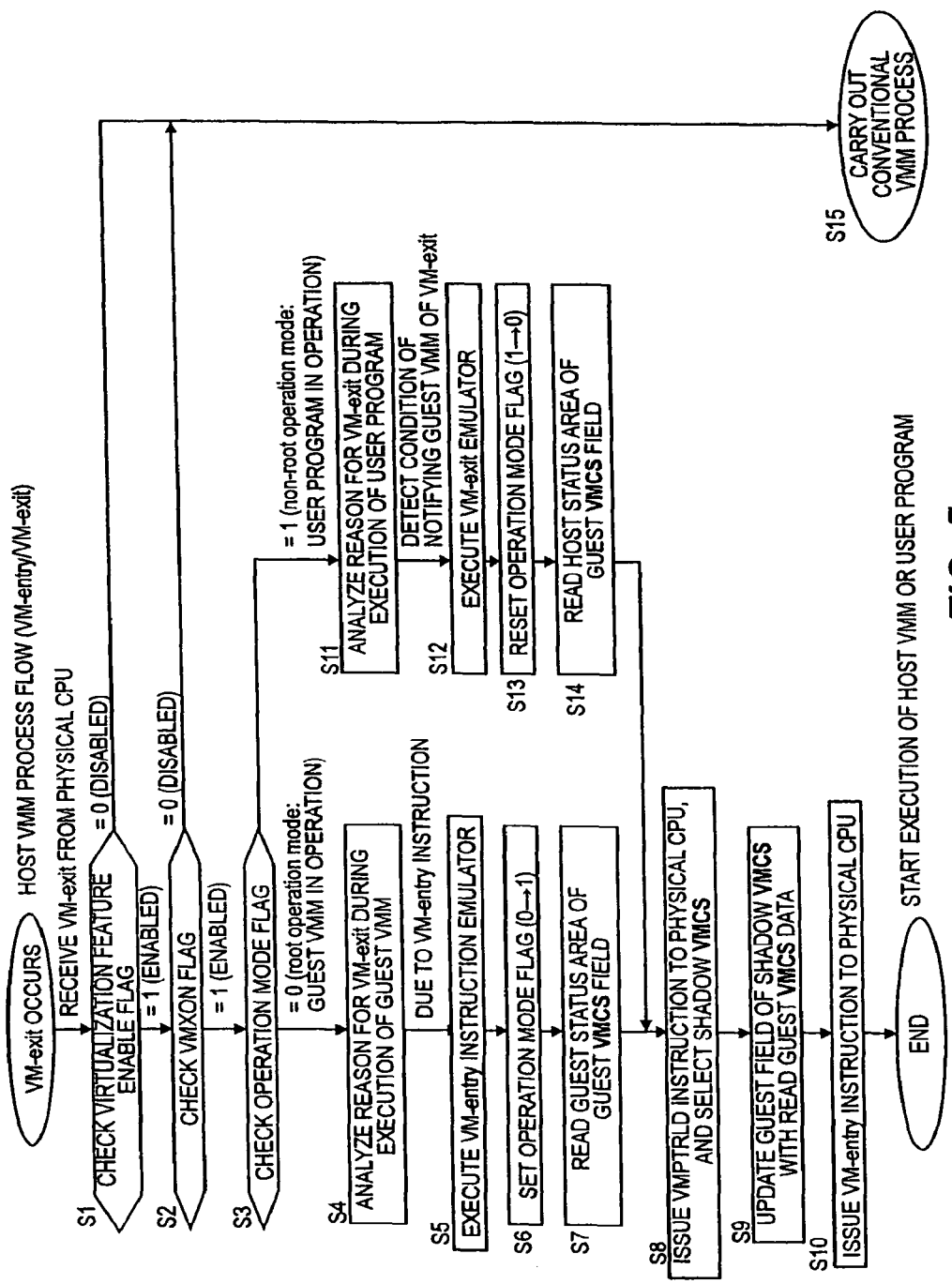
FIG. 5 is a flowchart showing an example of a process carried out by the CPU control module of the host VMM according to the first embodiment.

A description will now be given of a process carried out by the host VMM 10 with reference to FIG. 5. FIG. 5 is a flowchart showing an example of a process carried out by the CPU control module 12 of the host VMM 10 when the CPU control module 12 receives the VM-exit from the physical CPU 104 while the virtual servers 102a to 102n are operating. It should be noted that this is an example in which the reason for the VM-exit is the VM-entry instruction.

First, in Step S1, the CPU control module 12 of the host VMM 10 refers to the virtualization feature enable flag 141 of the host-VMM-held data 11 corresponding to a subject guest OS of the guest OS's 111a to 111n (referred to as guest OS hereinafter) which has caused the VM-exit, thereby determining whether or not the guest OS which has generated the VM-exit can use the VT-x feature. If the subject guest OS can use the VT-x feature, the CPU control module 12 proceeds to Step S2. On the other hand, if the subject guest OS does not use the VT-x feature (if the subject guest OS is the NT Server or the 2000 Server), the CPU control module 12 proceeds to Step S15, and the host VMM 10 carries out a virtual machine process as described in Publication of Translation of International Application No. 2005-529401, or "Intel 64 and IA-32 Architectures Software Developer's Manual VOL 2B".

In Step S2, the host VMM 10 refers to the VMXON flag 142 of the virtual CPU's 108a to 108n (referred to as virtual CPU hereinafter) which has caused the VM-exit, thereby determining whether the subject virtual CPU is in the VMX mode or not. If the VMXON flag 142 is "1", the virtual CPU is in the VMX mode, and then, the CPU control module 12 proceeds to Step S3. On the other hand, the VMXON flag 142 is "0", the virtual CPU is in the normal operation mode, and then, the CPU control module 12 proceeds to Step S15 similarly as described above, and the host VMM 10 carries out the conventional virtual machine process.

In Step S3, the CPU control module 12 of the host VMM 10 refers to the operation mode flag 143 of the subject virtual CPU, thereby determining whether the operation mode of the virtual CPU is the VMX root mode or the VMX non-root mode. If the operation mode flag 143 is "0", the CPU control module 12 determines that the virtual CPU is in the VMX root mode, and proceeds to Step S4. On the other hand, if the operation mode flag 143 is "1", the CPU control module 12 determines that the virtual CPU is in the VMX non-root mode, and proceeds to Step S11.

In Step S4, the CPU control module 12 identifies a reason for the generation of the VM-exit received from the physical CPU 104. In this example, since the operation mode of the virtual CPU is the VMX root mode, the CPU control module 12 refers to the guest status area 131 storing the statuses of the guest VMM 20, thereby identifying that the reason for the VM-exit is the VM-entry instruction issued by the guest VMM 20.

Then, in Step S5, the CPU control module 12 executes the VM-entry instruction execution module from the emulator 122, thereby emulating a predetermined process (such as the startup of the status area selection module 121) required for switching the subject virtual CPU to the VMX non-root mode in place of the guest VMM 20.

Then, in Step S6, since the CPU control module 12 of the host VMM 10 switches the operation mode of the virtual CPU from the VMX root mode to the VMX non-root mode, the CPU control module 12 updates the operation mode flag 143 of the subject virtual CPU to "1". Then, in Step S7, the CPU control module 12 reads the statuses of the guest OS or the application program stored in the guest status area 221 from the virtual CPU control data 21 of the subject guest VMM 20.

Then, in Step S8, the CPU control module 12 issues the VMPTRLD instruction to the physical CPU 104, thereby setting the shadow VMCS corresponding to the subject virtual CPU to be active, and sets the address of the activated shadow VMCS to the pointer 115. As a result of this VMPTRLD instruction (second control instruction), the host VMM 10 selects the shadow VMCS of the subject virtual CPU (virtual server) from the plurality of shadow VMCS's #0 to #n−1.

In Step S9, the CPU control module 12 updates the guest status area 131 of the subject shadow VMCS #0 with the information of the guest status area 221 read in Step S7. Then, in Step S10, the CPU control module 12 issues the VM-entry instruction to the physical CPU 104.

When the physical CPU 104 receives the VM-entry instruction, the physical CPU 104 executes the user program (guest OS or application program) of the subject virtual server based on the content of the guest status area 131 of the shadow VMCS specified by the pointer 115. When the physical CPU 104 receives the VM-entry instruction, the physical CPU 104 stores the statuses of the host VMM 10, which the physical CPU 104 has been executing, in the host status area 132 of the shadow VMCS, thereby preparing for the next call.

On the other hand, if the operation mode flag 143 is "1" in Step S3, since the subject virtual CPU is in the VMX non-root mode, which indicates that the subject virtual CPU is executing the user program, the CPU control module 12 executes a process of Step S11.

In Step S11, the CPU control module 12 refers to the list of reasons for the VM-exit shown in FIG. 4A, FIG. 4B and FIG. 4C, thereby searching the notice conditions 1363 for a VM-exit notice condition directed to the guest VMM. In this example, since the VM-entry instruction (VMLAUNCH or VMRESUME instruction) has caused the VM-exit, and thus meets the VM-exit notice condition.

Then, in Step S12, the CPU control module 12 executes the VM-exit condition detection module of FIG. 2, thereby emulating a predetermined process (such as the startup of the status area selection module 121) required for switching the subject virtual CPU to the VMX root mode in place of the user program.

Then, in Step S13, since the CPU control module 12 switches the operation mode of the subject virtual CPU from the VMX non-root mode to the VMX root mode, the CPU control module 12 resets the operation mode flag 143 of the subject virtual CPU to "0". Then, in Step S14, the CPU control module 12 reads the statuses of the guest VMM 20 stored in the host status area 221 from the virtual CPU control data 21 of the subject guest VMM 20.

When the process of Step S14 has been completed, the CPU control module 12 executes Steps S8 to S10, updates the guest status area 131 of the subject shadow VMCS with the information of the host status area 222 read in Step S14, thereby setting the statuses of the guest VMM 20, and issues the VM-entry instruction to the physical CPU 104.

As a result, when the physical CPU 104 receives the VM-entry instruction, the physical CPU 104 executes the guest VMM 20 of the subject virtual server based on the content of the guest status area 131 of the shadow VMCS specified by the pointer 115.

In this way, if the guest OS is the next-generation OS incorporating the virtualization feature, the host VMM 10 selects the statuses to be written to the guest status area 131 of the shadow VMCS from either of the guest VMM and the user program according to the operation mode of the virtual CPU and the reason for the generated VM-exit. Then, when the host VMM 10 issues the VM-entry instruction to the physical CPU 104 (first virtual CPU), it is possible to switch the execution on the virtual server between the guest VMM and the user program operating on the second virtual CPU provided by the guest VMM, and thus, the guest VMM can provide a plurality of virtualization environments (user programs) on the virtual server.

If it is determined that the guest OS does not use the virtualization feature in Step S1, or it is determined that the virtual CPU does not use the VT-x feature of the physical CPU 104 in Step S2, the virtual machine process according to Publication of Translation of International Application No. 2005-529401, or "Intel 64 and IA-32 Architectures Software Developer's Manual VOL 2B" may be carried out on the host VMM 10 in Step S15.

In the virtual machine process of Step S15, for example, the guest OS 111n of the virtual server 102n shown in FIG. 1 is a conventional OS, and if this guest OS 111n or the application program 112*n* (user program 110*n*) executes a predetermined instruction such as a privilege instruction, as described above, the physical CPU 104 notifies the host VMM 10 of the generation of the VM-exit.

When the host VMM 10 receives the notice of the VM-exit from the physical CPU 104, the host VMM 10 stores the statuses of the user program 110*n* (virtual CPU 108*n*) in the guest status area 131 of the shadow VMCS #n−1. Then, the host VMM 10 sets an address of the pointer 115 to the host status area in which the statuses of the host VMM 10 is stored, and carries out a predetermined process.

When the host VMM 10 has completed the predetermined process such as the privilege instruction, the host VMM 10 stores the statuses of the host VMM 10 in the host status area 132, sets the address of the pointer 115 to the guest status area 131, then, issues the VM-entry instruction (VMRESUME instruction), and passes the control to the virtual CPU 108*n*, thereby resuming the execution of the user program 110*n*.

In this way, according to this invention, it is possible to integrate a next-generation OS incorporating the virtualization feature and a conventional OS into the single physical server 101, thereby reducing the number of physical servers, and reducing the operation/management cost of the servers.

Further, as described above, the host VMM 10 can make it appear to the next-generation OS that the virtual CPU provides the VT-x feature, thereby enabling to cause an OS incorporating a virtualization software program to surely operate. Moreover, with the host VMM 10 according to this invention, there is no overhead caused by the conversion of an instruction sequence as in the conventional simulator, and, thus, there is no decrease in the performance of the virtual computer, and an OS incorporating a virtualization feature can be executed on the virtual server.

Moreover, according to this invention, since there are provided the plurality of shadow VMCS's #0 to #n−1 in correspondence to the plurality of virtual CPU's 108*a* to 108*n*, even when a plurality of guest VMM's 20 are executed on the physical server 101, it is possible to quickly switch a process only by switching the shadow VMCS's #0 to #n−1. As a result, even if a plurality of next-generation OS's are integrated on the physical server 101, it is possible to maintain the performance of the virtual server.

Figure 6:
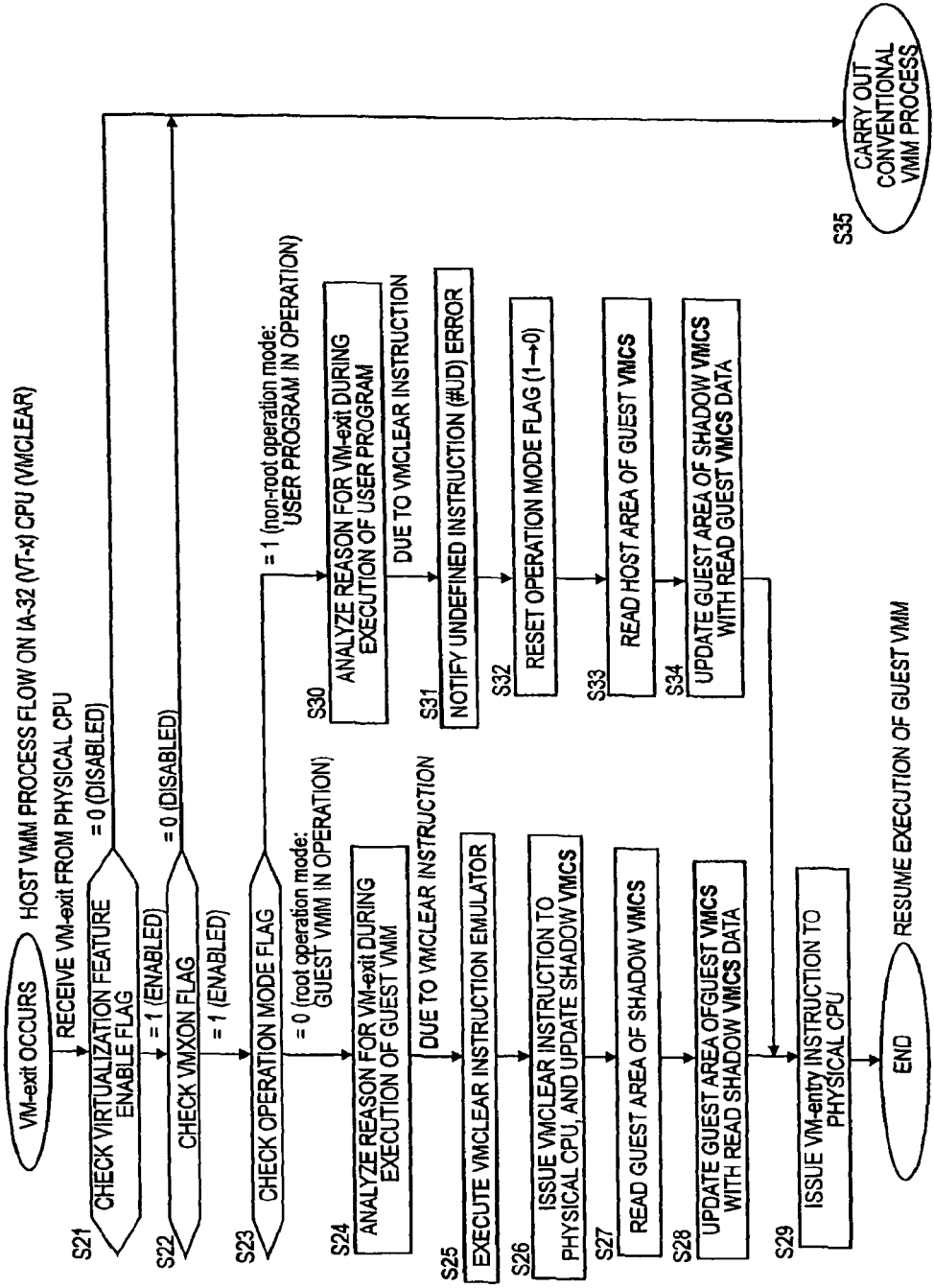
FIG. 6 is a flowchart showing an example of a process carried out by the CPU control module of the host VMM when the CPU control module receives the VM-exit caused by the execution of the VMCLEAR instruction from the physical CPU while the virtual servers are operating.

FIG. 6 is a flowchart showing an example of a process carried out by the CPU control module 12 of the host VMM 10 when the CPU control module 12 receives the VM-exit caused by the execution of the VMCLEAR instruction from the physical CPU 104 while the virtual servers are operating.

Steps S21 to S23 are the same as Steps S1 to S3 of FIG. 5, the CPU control module 12 of the host VMM 10 determines whether or not the subject guest OS, which has caused the VM-exit, can use the VT-x feature, and, by referring to the VMXON flag 142 of the subject virtual CPU, determines whether or not the subject virtual CPU is using the VT-x feature. If the subject guest OS does not use the VT-x feature, or the VMXON flag 142 is "0", which indicates that the virtual CPU is in the normal operation mode, the CPU control module 12 proceeds to Step S35, and the host VMM 10 carries out the conventional virtual machine process.

Moreover, the CPU control module 12 refers to the operation mode flag 143 of the subject virtual CPU, determines whether the operation mode of the virtual CPU is the VMX root mode or the VMX non-root mode, proceeds to Step S24 if the operation mode is the VMX root mode, and proceeds to Step S30 if the operation mode is the VMX non-root mode.

In Step S24, the CPU control module 12 identifies a reason for the generated VM-exit received from the physical CPU 104. In this example, the CPU control module 12 refers to the guest status area 131, thereby identifying the VMCLEAR instruction of the guest VMM 20 as a reason for the VM-exit.

Then, in Step S25, the CPU control module 12 carries out the emulation by starting the VMCLEAR instruction execution module from the emulator 122 of the CPU control module 12. In Step S26, the CPU control module 12 reads the operation status of the physical CPU 104 by means of the emulation, and updates the shadow VMCS corresponding to the subject virtual CPU. As a result, the statuses of the physical CPU 104 are reflected to the shadow VMCS.

In Step S27, the CPU control module 12 reads the statuses stored in the guest status area 131 of the shadow VMCS corresponding to the subject virtual CPU.

Then, in Step S28, the CPU control module 12 writes the statuses read from the guest status area 131 of the shadow VMCS in the guest status area 221 of the guest VMM 20, thereby updating the guest status area 221. As a result, the guest status area 221 of the guest VMM 20 is synchronized with the statuses of the physical CPU 104.

In Step S29, the CPU control module 12 sets the address of the pointer 115 to the guest status area 131 of the shadow VMCS corresponding to the subject virtual CPU, thereby issuing the VM-entry instruction to the physical CPU 104.

When the physical CPU 104 receives the VM-entry instruction, the physical CPU 104 executes the user program (guest OS or application program) of the subject virtual server based on the content of the guest status area 131 of the shadow VMCS specified by the pointer 115.

On the other hand, if it is determined that the operation mode flag 143 is "1" in Step S23, since the subject virtual CPU is in the VMX non-root mode, the CPU control module 12 executes a process of Step S30. In Step S30, the CPU control module 12 refers to the list of the reasons of the VM-exit of FIG. 4A, FIG. 4B and FIG. 4C, and analyzes the reason for the VM-exit. The CPU control module 12 searches the notice conditions 1363 for the VM-exit notice condition directed to the guest VMM. In this example, the VMCLEAR instruction has caused the VM-exit, and thus meets the VM-exit notice condition.

Then, in Step S31, the CPU control module 12 notifies the guest VMM 20 of an undefined instruction error. In other words, the CPU control module 12 notifies the guest VMM 20 that the VMCLEAR instruction could not be executed under the privilege of the user program.

Then, in Step S32, since the CPU control module 12 switches the operation mode of the subject virtual CPU from the VMX non-root mode to the VMX root mode, the CPU control module 12 resets the operation mode flag 143 of the subject virtual CPU to "0".

In Step S33, the CPU control module 12 reads the statuses of the guest VMM 20 stored in the host status area 221 from the virtual CPU control data 21 of the subject guest VMM 20.

In Step S34, the CPU control module 12 writes the statuses of the host status area 222 read in Step S33 in the guest status area 131 of the subject shadow VMCS, thereby updating the shadow VMCS. Then, in Step S29, the CPU control module 12 sets the address of the pointer 115 to the guest status area 131, and then issues the VM-entry instruction to the physical CPU 104.

As a result, when the physical CPU 104 receives the VM-entry instruction, the physical CPU 104 executes the guest VMM 20 of the subject virtual server based on the content of the guest status area 131 of the shadow VMCS specified by the pointer 115.

If it is determined that the guest OS does not use the virtualization feature in Step S21, or it is determined that the virtual CPU does not use the VT-x feature of the physical CPU 104 in Step S22, the virtual machine process according to Publication of Translation of International Application No. 2005-529401, or "Intel 64 and IA-32 Architectures Software Developer's Manual VOL 2B", cited in "BACKGROUND OF THE INVENTION", may be carried out by the host VMM 10 in Step S35 as in Step S15 of FIG. 5.

In this way, when the guest VMM 20 issues the VMCLEAR instruction, the host VMM 10 acquires the operation status of the physical CPU 104, and updates the guest status area 131 of the shadow VMCS with the acquired operation status. Then, the host VMM 10, by reflecting the statuses of the guest status area 131 of the shadow VMCS to the guest status area 221 of the guest VMCS, can synchronize the statuses of the physical CPU 104, the guest status area 131 of the host VMM 10, and the guest status area 221 of the guest VMM 20 with each other.

As a result, the next-generation OS incorporating the virtualization feature can smoothly provide a virtual environment on the virtual server.

Figure 7:
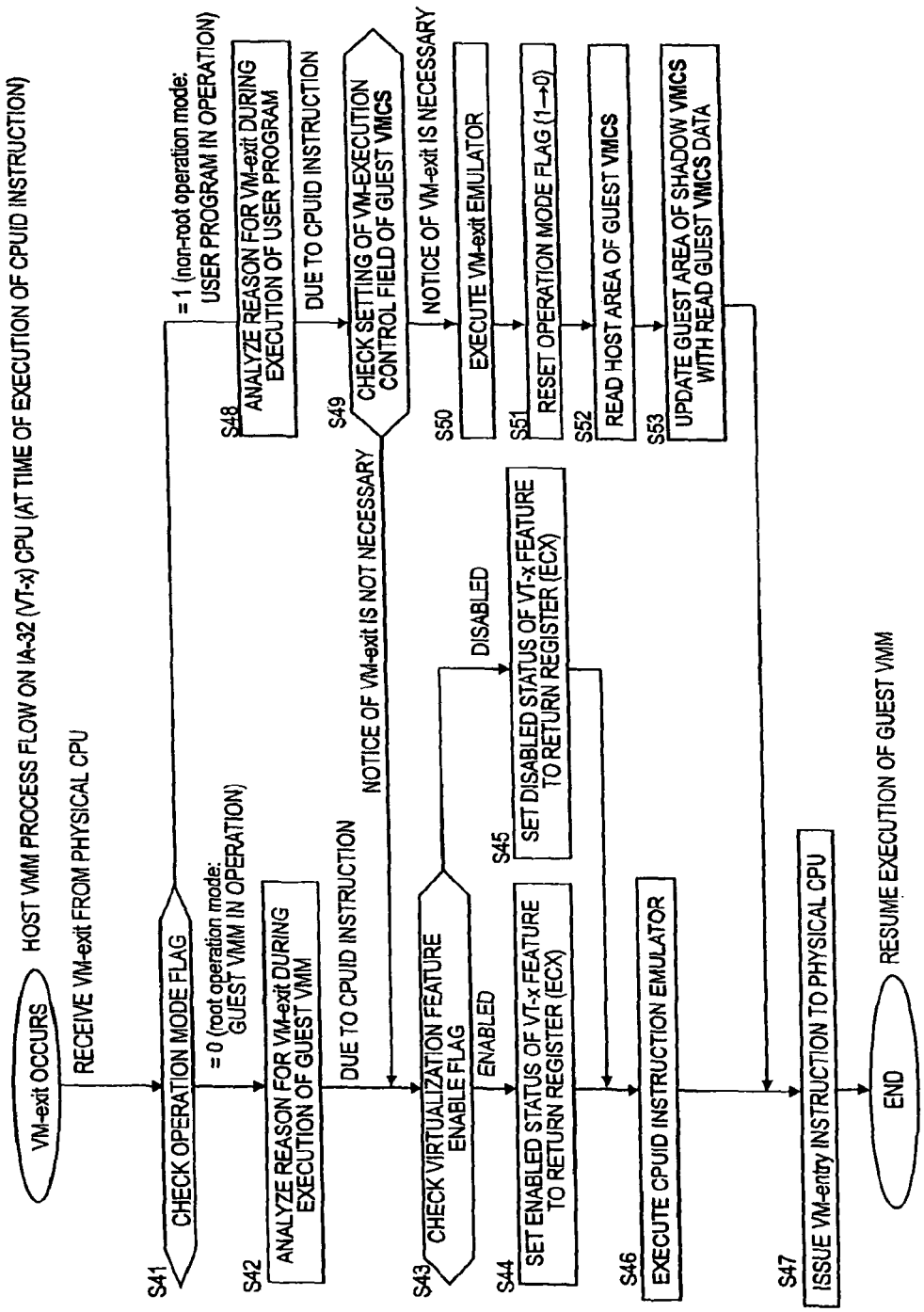
FIG. 7 is a flowchart showing an example of a process carried out by the CPU control module of the host VMM when the CPU control module receives the VM-exit caused by the execution of the CPUID instruction (third control instruction) from the physical CPU while the virtual servers are running

FIG. 7 is a flowchart showing an example of a process carried out by the CPU control module 12 of the host VMM 10 when the CPU control module 12 receives the VM-exit caused by the execution of the CPUID instruction (third control instruction) from the physical CPU 104 while the virtual servers 102a to 102n are running First, in Step S41, the CPU control module 12 of the host VMM 10, as in Step S3 of FIG. 5, refers to the operation mode flag 143 of the subject virtual CPU, which has caused the VM-exit, thereby determining whether the operation mode of the virtual CPU is the VMX root mode or the VMX non-root mode. If the operation mode flag 143 is "0", the CPU control module 12 determines that the virtual CPU is in the VMX root mode, and proceeds to Step S42. On the other hand, if the operation mode flag 143 is "1", the CPU control module 12 determines that the virtual CPU is in the VMX non-root mode, and proceeds to Step S48.

In Step S42, as in Step S4 of FIG. 5, the CPU control module 12 identifies the reason for the VM-exit received from the physical CPU 104 according to the value of the guest status area 131. In this example, since the operation mode is the VMX root mode, the CPU control module 12 identifies the reason for the VM-exit as the CPUID instruction of the VMM 20.

In Step S43, as in Step S1 of FIG. 5, the CPU control module 12 refers to the virtualization feature enable flag 141 of the host-VMM-held data 11 corresponding to a subject guest OS, which causes the VM-exit, and determines whether the guest OS which has generated the VM-exit can use the VT-x feature. If the subject guest OS can use the VT-x feature, the CPU control module 12 proceeds to Step S44. On the other hand, if the subject guest OS does not use the VT-x feature, the CPU control module 12 proceeds to Step S45.

In Step S44, the CPU control module 12 sets a predetermined bit of a return register (ECX in the case of the IA-32) indicating a returned value of the CPUID instruction to 1 (CPUID.1.ECX[5]=1), thereby carrying out the setting indicating that the VT-x feature is enabled.

On the other hand, in Step S45, the CPU control module 12 sets the predetermined bit of the return register (ECX in the case of IA-32) indicating the returned value of the CPUID instruction to 0, thereby carrying out the setting indicating that the VT-x feature is disabled.

Then, in Step S46, the CPU control module 12 starts the CPUID instruction execution module of the emulator 122, carries out a check for faults to be notified to the guest VMM 20 or the user program, and stores a result of the check in the guest status area 131.

In Step S47, the CPU control module 12 issues the VM-entry instruction to the physical CPU 104, thereby passing the control to the virtual server.

On the other hand, if it is determined in Step S41 that the user program is being executed, which is indicated by "1" of the operation mode flag 143 (VMX non-root mode), the CPU control module 12 proceeds to Step S48, and analyzes the reason for the VM-exit during the execution of the user program. In Step S48, the CPU control module 12 identifies the reason for the generated VM-exit received from the physical CPU 104 according to the value in the guest status area 131. In this example, since the operation mode is the VMX non-root mode, the CPU control module 12 identifies the reason for the VM-exit as the CPUID instruction of the guest OS or the application program.

In Step S49, the CPU control module 12 determines whether a notice to the guest VMM 20 is necessary for the VM-exit caused by the CPUID instruction during the execution of the user program. This determination is made by the CPU control module 12 by referring to information set in advance in the VM-execution control field 223 of the guest VMCS 22 of the virtual CPU control data 21. If it is necessary to notify the guest VMM 20 of the VM-exit caused by the CPUID instruction, the CPU control module 12 proceeds to Step S50. On the other hand, if it is not necessary to notify the guest VMM 20 of the VM-exit, the CPU control module 12 proceeds to Step S43, and carries out the above-mentioned processes starting from Step S43.

In Step S50, in order to notify the guest VMM 20 of the VM-exit, the CPU control module 12 executes the VM-exit emulator, thereby resetting the operation mode flag 143 of the subject virtual CPU to "0", and switching the VMX mode to the VMX root mode in Step S51.

Then, in Step S52, the CPU control module 12 reads the statuses of the host status area 222 of the subject guest VMCS 22. In Step S53, the CPU control module 12 writes the read statuses to the guest status area 131 of the shadow VMCS of the subject virtual CPU, thereby updating the guest status area 131. Then, in Step S47, the CPU control module 12 issues the VM-entry instruction to the physical CPU 104, thereby passing the control to the guest VMM 20.

As described above, when the guest VMM 20 issues the CPUID instruction, and when the VM-exit caused by the CPUID instruction is not notified to the guest VMM 20, after setting the value of the return register according to the setting of the virtualization feature enable flag 141, the CPU control module 12 can issue the VM-entry instruction, thereby returning the control to the guest VMM 20 or the user program. Moreover, when the user program has issued the CPUID instruction, and it is necessary to notify the guest VMM 20 of the VM-exit, the CPU control module 12 can update the guest status area 131 of the shadow VMCS with the content of the host status area 222 of the guest VMCS 22, thereby passing the control to the guest VMM 20.

As described above, according to the first embodiment, since the host VMM 10 monitors the statuses of the guest OS and the application program and the statuses of the virtual CPU, thereby rewriting the guest status area 131 of the shadow VMCS, it is possible to surely operate the next-generation OS incorporating the virtualization feature without decreasing the performance of the virtual server. Then, it is possible to make the next-generation OS incorporating the virtualization feature and a conventional OS to coexist on the single physical server 101, thereby efficiently carrying out the server integration, resulting in a reduction of an operation cost of the server.

The user interface provided by the host VMM 10 to the management console 300 is constructed by a GUI shown in FIG. 8, for example. FIG. 8 is a screen image showing a user interface used for enabling/disabling the virtualization feature for each virtual server. In FIG. 8, "VM#" indicates an identifier of the virtual server, and "Present Setting" indicates whether the virtualization feature is enabled or disabled by "ON" or "OFF", respectively. Then, by setting "New Setting" to "ON" or "OFF", and then, clicking "OK" in a lower left section on the screen, it is possible to switch the virtualization feature of a desired virtual server to the enabled or disabled status. In other words, the host VMM 10 sets, according to a value of the "New Setting" input from the user interface 301, "1" or "0" to the virtualization feature enable flag 141 of the corresponding virtual server of the host-VMM-held data 11. As a result, it is possible to set the setting value input from the user interface 301 to an arbitrary virtual server.

It should be noted that the host VMM 10 can be provided as a program stored on a recording medium such as an optical disk and a magnetic disk.

(Second Embodiment)

Figure 9:
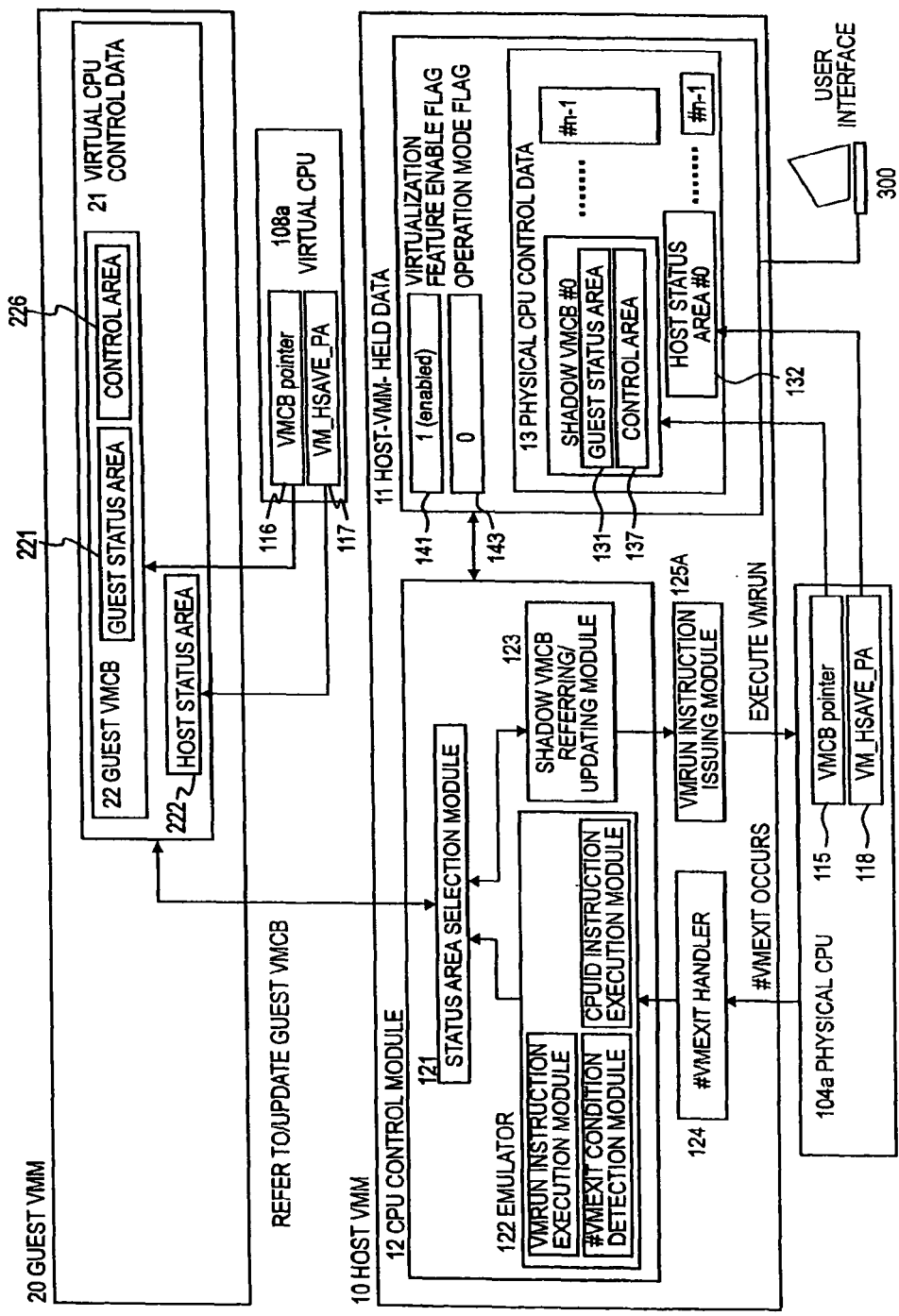
FIG. 9 is a block diagram showing functions of the host VMM and the guest VMM when a physical CPU supports the AMD-V feature according to a second embodiment of this invention.

FIG. 9 shows a second embodiment, and is a block diagram showing functions of the host VMM and the guest VMM when a physical CPU supports the AMD-V feature. The second embodiment is obtained by replacing the VT-x feature of the physical CPU 104 according to the first embodiment with the AMD-V (Virtualization) feature described in "AMD-Virtualization (AMD-V)".

In FIG. 9, a physical CPU 104a on which the AMD-V feature is implemented includes a pointer 118 pointing to an address of the host status area 132 in addition to the pointer 115 pointing to the address of the shadow VMCB of the host VMM 10 according to the first embodiment.

The physical CPU 104a including the AMD-V feature executes the VMRUN instruction instead of the VM-entry instruction to switch the operation mode from the host mode for executing the host VMM 10 to the guest mode for executing the guest VMM 20 or the user program. The host VMM 10 according to a specification of the AMD-V feature is different from the first embodiment according to the VT-x feature in the following points.

Figure 10:
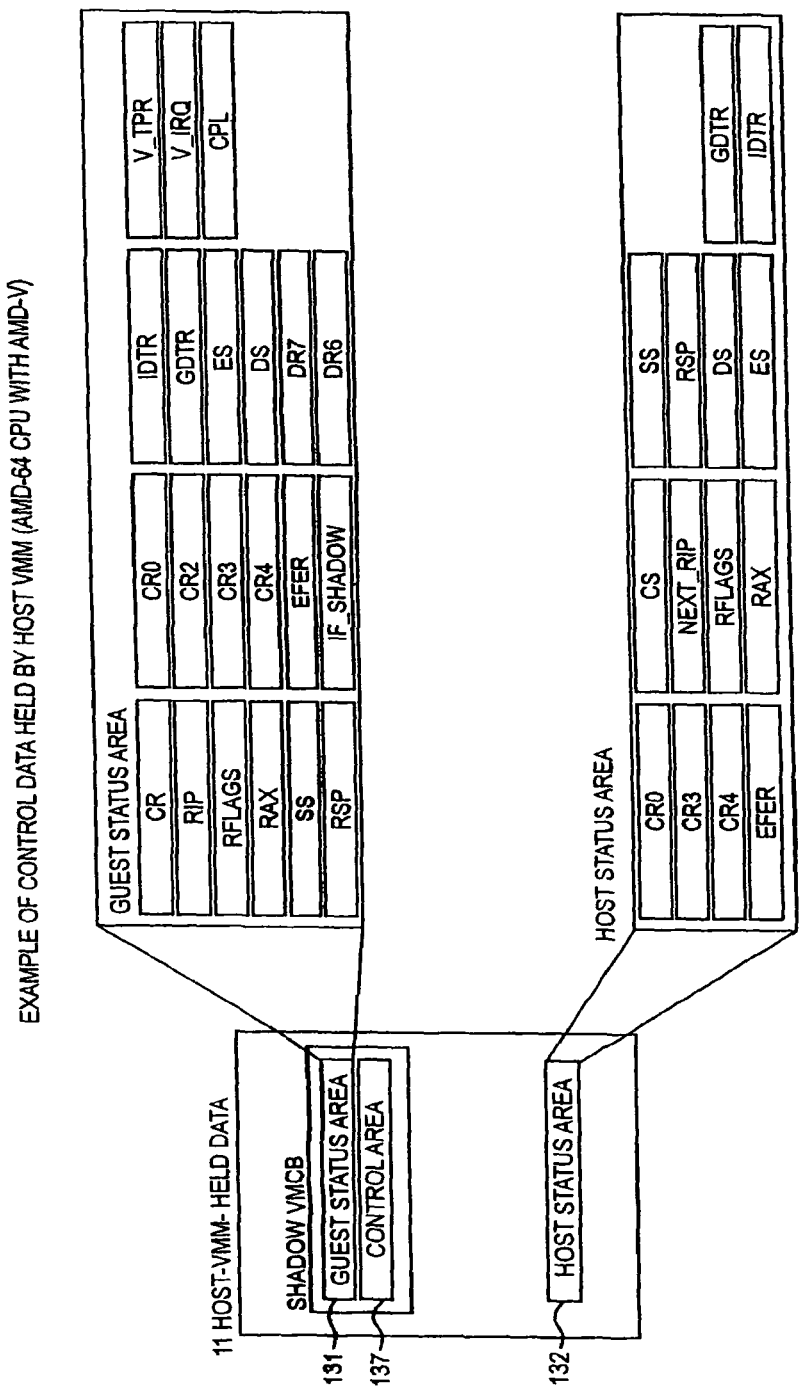
FIG. 10 is a block diagram showing an example of the control data of the shadow VMCB of the host-VMM-held data according to a second embodiment of this invention.

Of the host-VMM-held data 11, the VMXON flag 142 according to the first embodiment is removed, and the virtualization feature enable flag 141 for the respective virtual servers and the operation mode flag 143 for the respective virtual CPU's 108a to 108n are provided. Then, as shown in FIG. 10, the physical CPU control data 13 of the host-VMM-held data 11 includes the host status area 132 for the respective virtual CPU's 108a to 108n, and the guest status area 131 and a control area 137 of the shadow VMCB's #0 to #n−1 for the respective CPU's 108a to 108n. It should be noted that the control area 137 of the shadow VMCB's #0 to #n−1 stores information corresponding to the VM-exit information field 136 according to the first embodiment. FIG. 10 shows the second embodiment, and is a block diagram showing an example of the control data of the shadow VMCB of the host-VMM-held data.

Figure 11A:
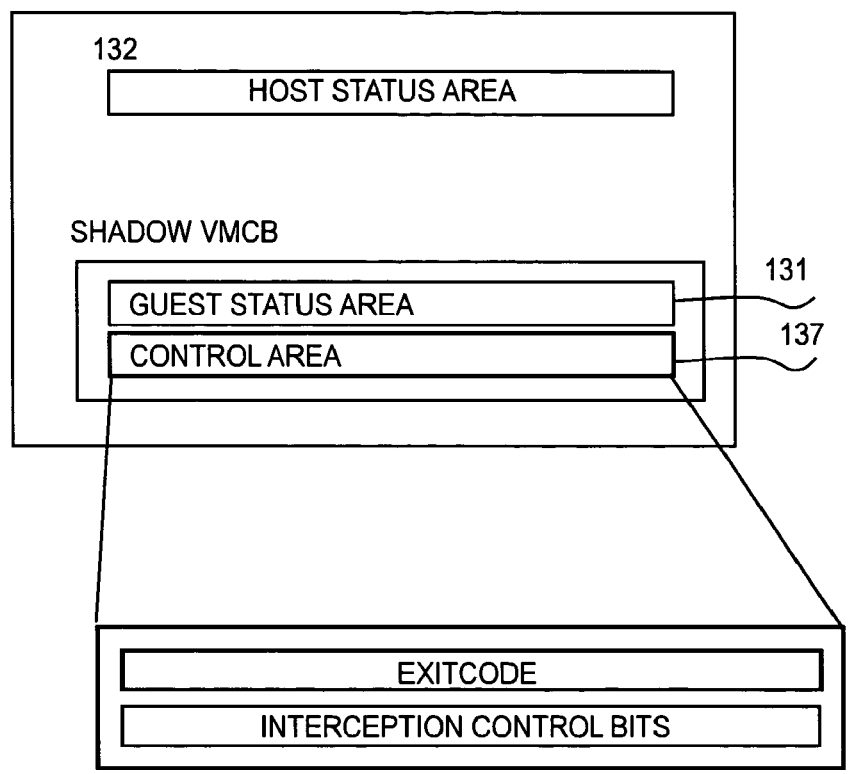
FIG. 11A is a block diagram showing an example of the host VMM held data according to a second embodiment of this invention.

In other words, as shown in FIG. 11A, FIG. 11B and FIG. 11C, the control area 137 includes EXITCODE's 1371 indicating a code of a reason for generation of #VMEXIT (corresponding to the VM-exit according to the first embodiment) set in advance, code names 1372, determination results 1373 indicating that the code is caused by the VMRUN instruction, and notice conditions 1374 for notifying the guest VMM 20 of the #VMEXIT. FIG. 11A, FIG. 11B and FIG. 11C are diagrams showing an example of the list of the reasons for the #VMEXIT.

The emulator 122 of the CPU control module 12 includes a VMRUN instruction execution module in place of the VM-entry instruction execution module, and the VMCLEAR instruction execution module is removed. Moreover, the CPU control module 12 includes a VMRUN instruction issuing module 125A for issuing the VMRUN instruction to the physical CPU 104a in place of the VM-entry instruction issuing module according to the first embodiment.

The virtual CPU's 108a to 108n, with which the host VMM 10 provides the virtual servers 102a to 102n, according to the change in the configuration of the physical CPU 104a, include, in addition to the pointer 116 pointing to the address of the guest status area 221 in the guest VMM 20, a pointer 117 pointing to the address of the host status area 222. It should be noted that the guest VMM 20 runs on the virtual server 102a when the next-generation OS incorporating the virtualization feature is employed as the guest OS 111a as on the virtual server 102a according to the first embodiment.

The virtual CPU control data 21 of the guest VMM 20 is, as well as the host-VMM-held data 11 of the host VMM 10, constructed by the host status area 222 for holding statuses of the guest VMM 20 according to the specification of the AMD-V feature, and the guest VMCB 22 including the guest status area 221 for storing statuses of the user program, and the control area 226.

With the above-mentioned configuration, when the host VMM 10 receives the #VMEXIT from the physical CPU 104a, the host VMM 10, by writing the content of the guest status area 221 or the host status area 222 of the guest VMM 20 to the guest status area 131 of the shadow VMCB's #0 to #n−1, can switch between the VMM 20 integrated into the next-generation OS running on the virtual server 102a and the user program running on this guest VMM 20.

Figure 12:
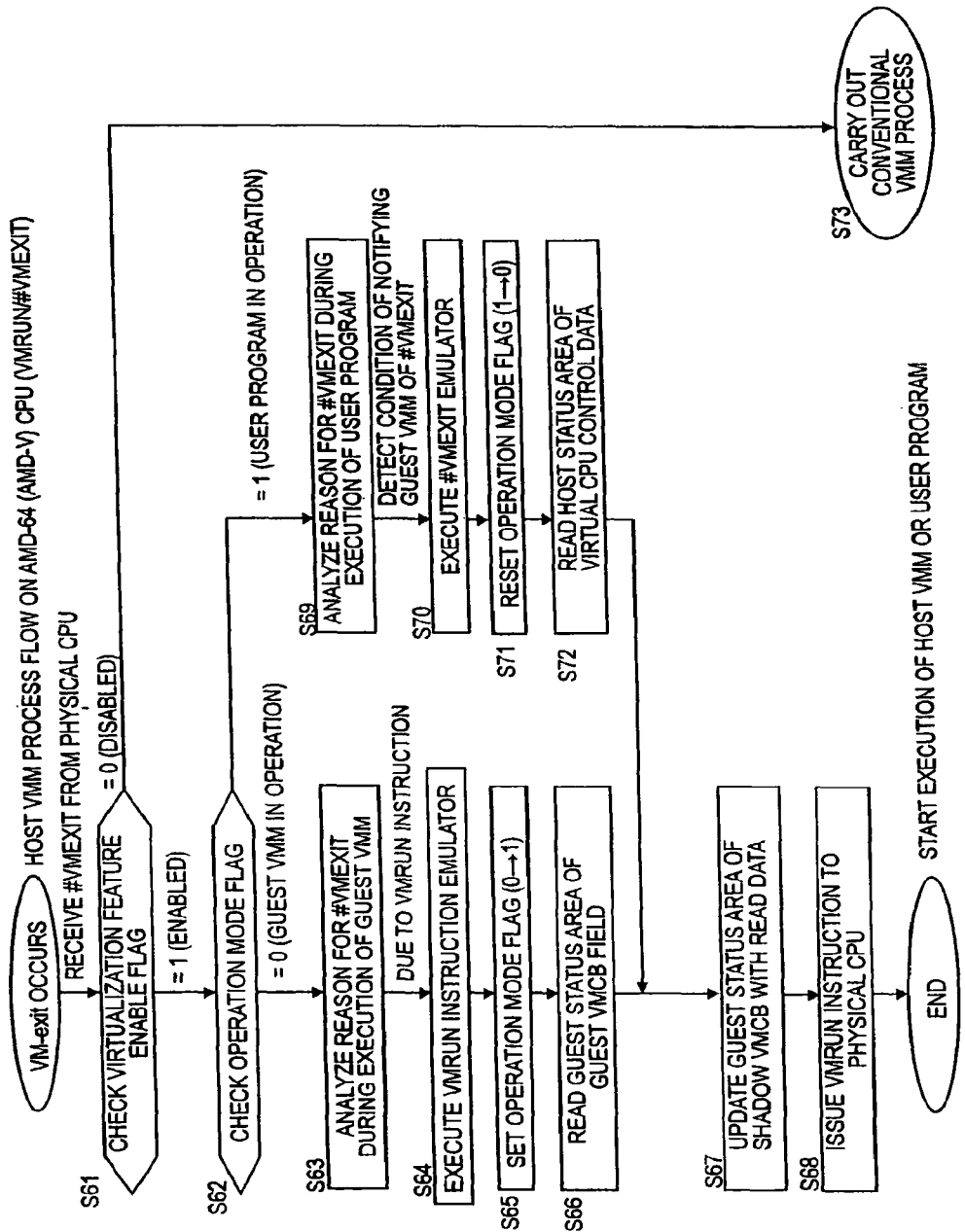
FIG. 12 is a flowchart showing an example of the process carried out by the CPU control module of the host VMM when the CPU control module receives the #VMEXIT from the physical CPU according to a second embodiment of this invention.

A description will now be given of a process carried out by the host VMM 10 with reference to FIG. 12. FIG. 12 is a flowchart showing an example of the process carried out by the CPU control module 12 of the host VMM 10 when the CPU control module 12 receives the #VMEXIT from the physical CPU 104a while the virtual server 102a is operating. It should be noted that this is an example in which the reason for the #VMEXIT is because of the VMRUN instruction.

First, in Step S61, the CPU control module 12 of the host VMM 10 refers to the virtualization feature enable flag 141 of the host-VMM-held data 11 corresponding to a subject guest OS 111a (hereinafter, referred to as guest OS) which has caused the #VMEXIT, and determines whether the guest OS which has generated the #VMEXIT can use the AMD-V feature. If the virtualization feature enable flag 141 is "1", the CPU control module 12 determines that the subject guest OS can use the AMD-V feature, and proceeds to Step S62. On the other hand, if the virtualization feature enable flag 141 is "0", the CPU control module 12 determines that the subject guest OS does not use the AMD-V feature, and proceeds to Step S73. In Step S73, as in Step S15 shown in FIG. 5 according to the first embodiment, the host VMM 10 carries out a conventional virtual machine process described in "BACKGROUND OF THE INVENTION".

In Step S62, the CPU control module 12 of the host VMM 10 refers to the operation mode flag 143 of the subject virtual CPU, thereby determining whether the operation mode of the virtual CPU is the host mode (VMX root mode according to the first embodiment) or the guest mode (VMX non-root mode according to the first embodiment). If the operation mode flag 143 is "0", the CPU control module 12 determines that the virtual CPU is in the host mode, and the CPU control module 12 proceeds to Step S63. On the other hand, if the operation mode flag 143 is "1", the CPU control module 12 determines that the virtual CPU is in the guest mode, and the CPU control module 12 proceeds to Step S69.

In Step S63, the CPU control module 12 identifies a reason for the generated #VMEXIT received from the physical CPU 104a. In this example, since the operation mode of the virtual CPU is the host mode, the CPU control module 12 refers to the guest status area 131 storing the statuses of the guest VMM 20, and identifies the VMRUN instruction issued by the guest VMM 20 as the reason for the #VMEXIT.

Then, in Step S64, the CPU control module 12 executes the VMRUN instruction execution module from the emulator 122, thereby emulating a predetermined process (such as the startup of the status area selection module 121) required for switching the operation mode of the subject virtual CPU to the guest mode in place of the guest VMM 20.

Then, in Step S65, since the CPU control module 12 of the host VMM 10 switches the operation mode of the virtual CPU from the host mode to the guest mode, the CPU control module 12 updates the operation mode flag 143 of the subject virtual CPU to "1".

Then, in Step S66, the CPU control module 12 reads the statuses of the user program (the guest OS or the application program) stored in the guest status area 221 from the guest VMCB 22 of the subject guest VMM 20.

In Step S67, the CPU control module 12 updates the guest status area 131 of the subject shadow VMCB #0 with the information of the guest status area 221 read in Step S66. Then, in Step S68, the CPU control module 12 issues the VMRUN instruction to the physical CPU 104a (subject virtual CPU 108a).

When the physical CPU 104a receives the VMRUN instruction, the physical CPU 104a executes the user program (guest OS or application program) of the subject virtual server based on the content of the guest status area 131 of the shadow VMCB specified by the pointer 115. When the physical CPU 104a receives the VMRUN instruction, the physical CPU 104a stores the statuses of the host VMM 10 in the host status area 132 of the host-VMM-held data 11 in preparation for the next call.

On the other hand, if the operation mode flag 143 is "1" in Step S62, the subject virtual CPU is in the guest mode, which indicates that the subject virtual CPU is executing the user program, and the CPU control module 12 executes a process in Step S69. In Step S69, the CPU control module 12 acquires the EXITCODE, refers to the list of reasons for the #VMEXIT shown in FIG. 11A, FIG. 11B and FIG. 11C, and searches the notice conditions 1374 for the #VMEXIT notice condition directed to the guest VMM 20 because the user program is being executed on the subject virtual server. In this example, the VMRUN instruction has caused the #VMEXIT, and thus meets the #VMEXIT notice condition. Then, in Step S70, the CPU control module 12 executes the #VMEXIT condition detection module of FIG. 9 from the emulator 122, thereby emulating a predetermined process (such as the startup of the status area selection module 121) required for switching the operation mode of the subject virtual CPU to the host mode in place of the user program.

Then, in Step S71, in order to switch the operation mode of the subject virtual CPU from the guest mode to the host mode, the CPU control module 12 resets the operation mode flag 143 of the subject virtual CPU to "0".

Then, in Step S72, the CPU control module 12 reads the statuses of the guest VMM 20 stored in the host status area 222 of the virtual CPU control data 21 of the subject guest VMM 20.

When the CPU control module 12 has completed the process in Step S72, the CPU control module 12 executes Steps S67 and S68, updates the guest status area 131 of the subject shadow VMCB with the information of the host status area 222 read in Step S72, and issues the VMRUN instruction to the physical CPU 104a (subject virtual CPU 108a). As a result, when the physical CPU 104a receives the VMRUN instruction, the physical CPU 104a executes the guest VMM 20 of the subject virtual server based on the content of the guest status area 131 of the shadow VMCB specified by the pointer 115.

In this way, when the guest OS running on the virtual server is the next-generation OS incorporating the virtualization feature, the host VMM 10 selects the statuses to be written to the guest status area 131 of the shadow VMCB from one of the guest VMM 20 and the user program according to the operation mode of the virtual CPU and the reason for a generated #VMEXIT. Then, when the host VMM 10 issues the VMRUN instruction to the physical CPU 104a, it is possible to switch between the executions of the guest VMM 20 running on the first virtual CPU and the user program running on the second virtual CPU provided by the guest VMM 20 on the virtual server, and the guest VMM 20 can thus provide virtualization environments on the virtual server.

If it is determined that the guest OS does not use the virtualization feature in Step S61, the virtual machine process according to Publication of Translation of International Application No. 2005-529401, or "Intel 64 and IA-32 Architectures Software Developer's Manual VOL 2B", cited in "BACKGROUND OF THE INVENTION", may be carried out on the host VMM 10 in Step S73.

In the virtual machine process in Step S73, for example, the guest OS 111n of the virtual server 102n shown in FIG. 1 is a conventional OS, and if this guest OS 111n or the application program 112n (user program 110n) executes a predetermined instruction such as a privilege instruction, as described above, the physical CPU 104a notifies the host VMM 10 of the generation of the #VMEXIT.

When the host VMM 10 receives the notice of the #VMEXIT from the physical CPU 104a, the host VMM 10 stores the statuses of the user program 110n (virtual CPU 108n) in the guest status area 131 of the shadow VMCB #n−1.

When the host VMM 10 has completed the predetermined process such as the privilege instruction, the host VMM 10 stores the statuses of the host VMM 10 to the host status area 132, sets the address of the pointer 115 to the address of the guest status area 131, then issues the VMRUN instruction, and passes the control to the virtual CPU 108n, thereby resuming the execution of the user program 110n.

In this way, according to the second embodiment, as well as the first embodiment, it is possible to run the next-generation OS incorporating the virtualization feature on the host VMM 10. Then, it is possible to integrate the next-generation OS incorporating the virtualization feature and a conventional OS into the single physical server 101, thereby reducing the number of physical servers, and reducing the operation/management cost of the servers.

Moreover, as described above, the host VMM 10 can make it appear to the guest VMM 20 running on the first virtual CPU that the first virtual CPU provides the AMD-V feature, thereby enabling the OS incorporating the virtualization software program to surely operate. Moreover, with the host VMM 10 according to this invention, there is no overhead caused by the conversion of an instruction sequence as in the conventional simulator, and thus, there is no decrease in the performance of the virtual computer, and the OS incorporating the virtualization feature can be executed on the virtual server.

(Third Embodiment)

Figure 13:
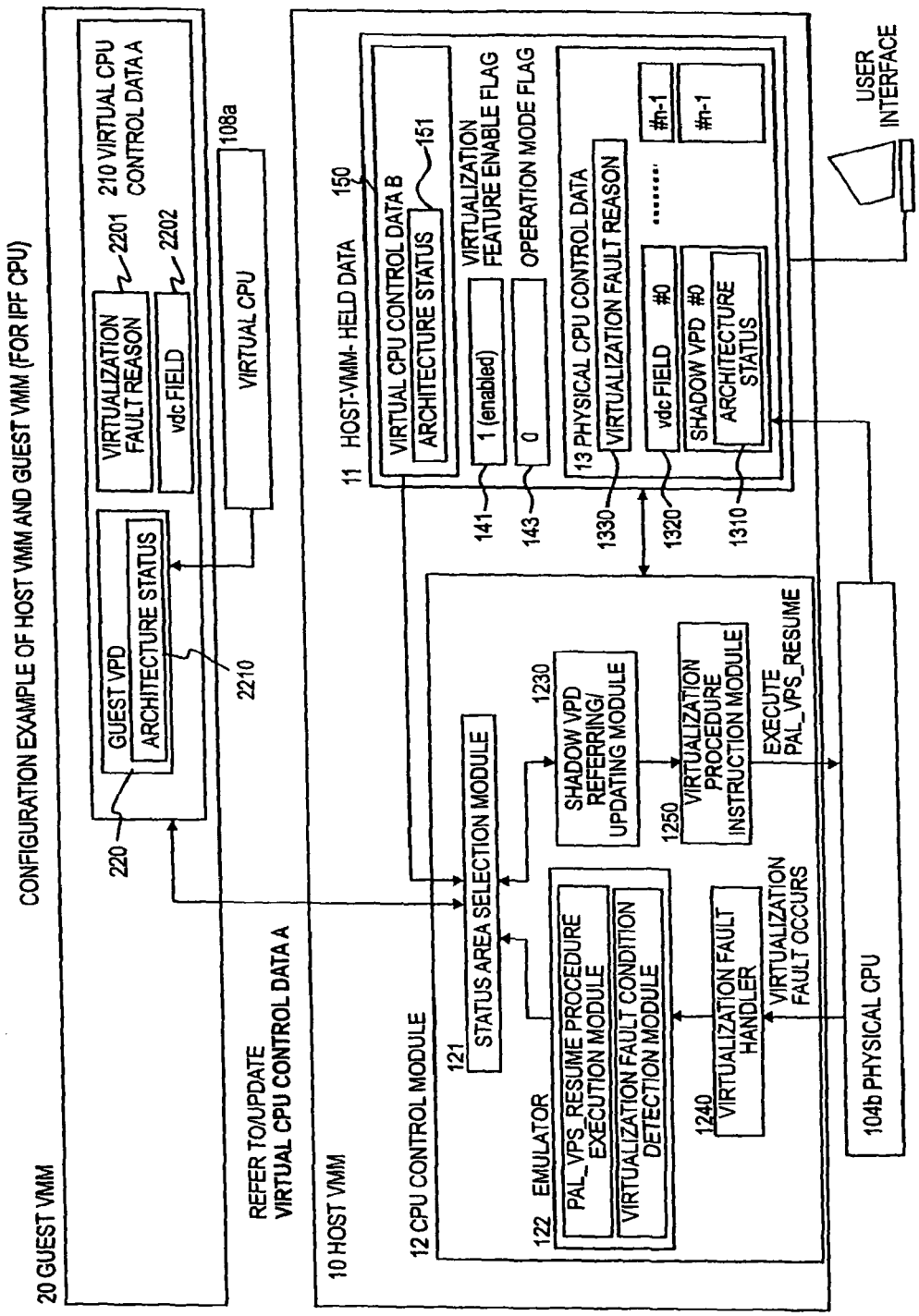
FIG. 13 is a block diagram showing functions of the host VMM and the guest VMM when the physical CPU supports the VT-i feature according to a third embodiment of this invention.

FIG. 13 shows a third embodiment, and is a block diagram showing functions of the host VMM and the guest VMM when the physical CPU supports the VT-i feature. The third embodiment is obtained by replacing the VT-x feature of the physical CPU 104 according to the first embodiment with the VT-i feature of the Itanium Processor Family (IPF) according to "Intel Itanium Architecture Software Developer's Manual", with respect to the virtualization feature.

In FIG. 13, when an instruction or an event set in advance occurs while a physical CPU 104b incorporating the VT-i feature is executing a guest (guest VMM 20 or user program 110a), the physical CPU 104b generates a virtualization fault, and passes the control to the host VMM 10. When the host VMM 10 detects the virtualization fault, the host VMM 10 executes (emulates) a virtualization procedure set in advance (such as PAL_VPS_RESUME procedure), updates a shadow virtual processor descriptor (shadow VPD) used for controlling the virtual CPU's 108a to 108n, and issues the virtualization procedure (PAL_VPS_RESUME procedure) to the physical CPU 104b, thereby passing the control to the guest. It should be noted that the PAL_VPS_RESUME_NORMAL procedure call and the PAL_VPS_RESUME_HANDLER procedure call are generally referred to as PAL_VPS_RESUME procedure.

In other words, the physical CPU 104b has an architecture for switching the control between the host VMM 10 and the guest by generating a virtualization fault in place of the VM-exit according to the first embodiment, and executing a virtualization procedure in place of the VM-entry instruction. Details thereof are described in "Intel Itanium Architecture Software Developer's Manual", and hence a detailed description of this architecture is omitted.

In the host-VMM-held data 11 of the host VMM 10, virtual CPU control data B 150 storing, in addition to the virtualization feature enable flag 141 and the operation mode flag 143 according to the first embodiment, an architecture status 151 for storing statuses of the virtual CPU's 108a to 108n is provided.

The physical CPU control data 13 stores the following data according to the specification of the VT-i feature. The physical CPU control data 13 includes shadow VPD's #0 to #n−1 including an architecture status 1310 for storing statuses of the respective virtual CPU's 108a to 108n, virtualization disable control (VDC) fields #0 to #n−1 (1320) used for setting restriction on the generation of the virtualization fault for the respective virtual CPU's 108a to 108n, and a virtualization fault reason 1330 for defining, in advance, instructions and events which generate a virtualization fault on the physical CPU 104b of instructions or events executed by the virtual CPU's 108a to 108n.

Figure 14:
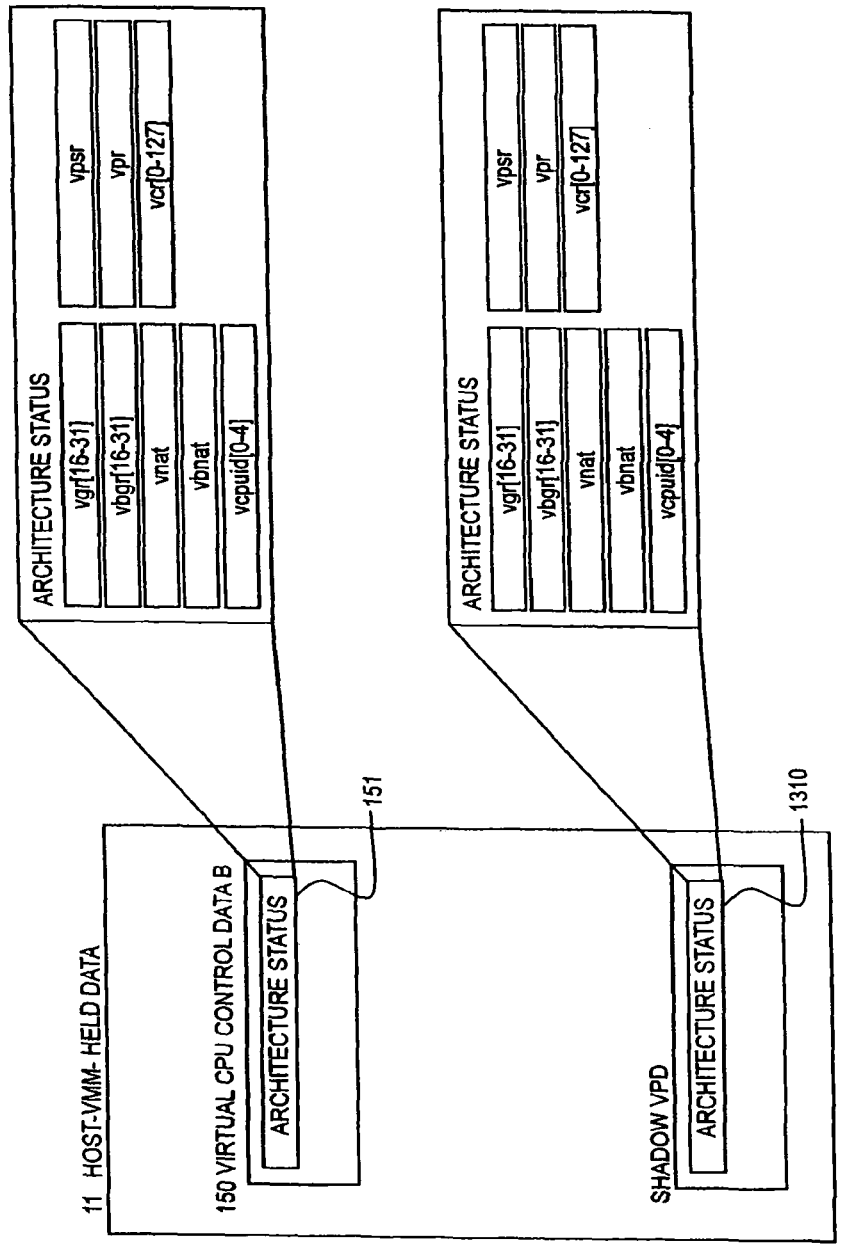
FIG. 14 is a block diagram showing an example of the control data of the shadow VPD and the virtual CPU control data of the host-VMM-held data according to a third embodiment of this invention.

FIG. 14 shows the architecture status 151 and 1310 stored in the host-VMM-held data 11. The architecture status 151 of the virtual CPU control data B 150 stores the statuses of the guest (guest VMM 20 or user program 110a) executed by the virtual CPU's 108a to 108n, and the architecture status 1310 of the shadow VPD stores the statuses of the guest or the host VMM 10 executed on the physical CPU 104b. FIG. 14 shows the third embodiment, and is a block diagram showing an example of the control data of the shadow VPD and the virtual CPU control data B 150 of the host-VMM-held data 11.

Figure 15A:
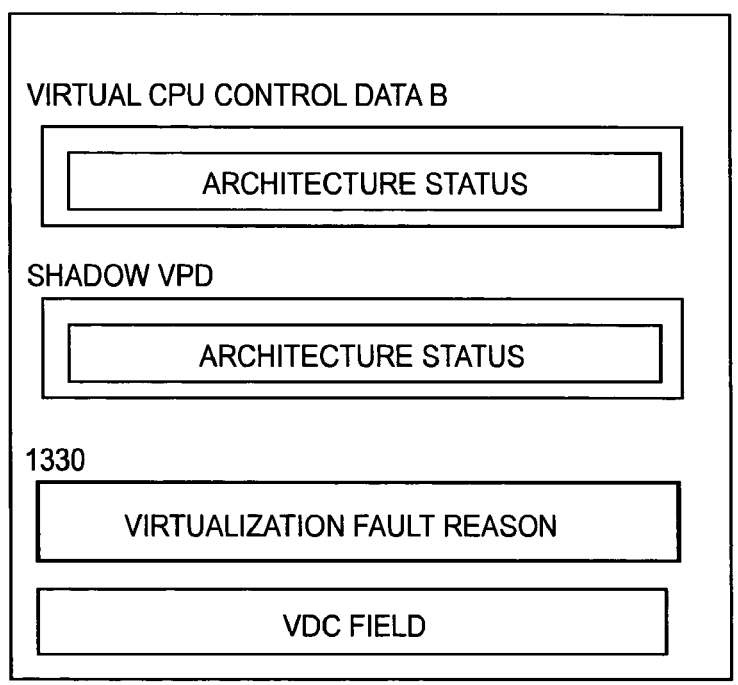
FIG. 15A is a block diagram showing an example of the host VMM held data according to a third embodiment of this invention.

Moreover, the virtualization fault reason 1330 stored in the physical CPU control data 13 of the host-VMM-held data 11 is set as shown in a virtualization fault reason list of FIG. 15A, FIG. 15B and FIG. 15C, for example. In FIG. 15A, FIG. 15B and FIG. 15C, the virtualization fault reason list includes codes 1331 indicating reasons for the virtualization fault, contents 1332 of the virtualization fault corresponding to the respective codes, call settings 1333 used for calling the PAL_VPS_RESUME procedure for passing the control to the guest, and notice settings 1334 used for notifying the guest VMM 20 of the virtualization fault. An instruction including the call setting 1333 of ".smallcircle." calls the PAL_VPS_RESUME procedure for passing the control to the guest. Moreover, an instruction including the notice setting 1334 of ".smallcircle." carries out the notice to the guest VMM 20 when the generation of the virtualization fault is not restricted by the VDC field 2202 of the guest VMM 20.

The statuses of the virtual CPU 108a held by the guest VMM 20 is stored in virtual CPU control data A 210. The virtual CPU control data A 210 includes a guest VPD 220 including an architecture status 2210 for storing statuses of the virtual CPU 108a, a virtualization fault reason 2201 defining an instruction or an event which generates the virtualization fault on the virtual CPU 108a of instructions or events executed by the guest OS or the application program, and a VDC field 2202 indicating whether or not the virtual CPU 108a executing the guest VMM 20 uses the VT-i feature. FIG. 15A, FIG. 15B and FIG. 15C show the third embodiment, and is an explanatory diagram showing an example of the list of reasons for the virtualization fault.

The CPU control module 12 includes a virtualization fault handler 1240 for detecting the virtualization fault from the physical CPU 104b, and notifying the emulator 122 of the virtualization fault, the emulator 122 causing a process, which has become the virtualization fault, to be executed on the processor abstraction layer (PAL) provided by the physical CPU 104b, a status area selection module 121 for selecting the architecture status 2210 of the guest VPD or the architecture status 151 of the virtual CPU control data B 150 of the host-VMM-held data 11 based on the operation status of the virtual CPU 108a, a shadow VPD referring/updating module 1230 for updating the architecture status 1310 of the shadow VPD with the information selected by the status area selection module 121, and a virtualization procedure instruction module 1250 for instructing the physical CPU 104b to execute a predetermined procedure for switching the control from the host VMM 10 to the guest VMM 20 or the user program running on the second virtual CPU 208a on the guest VMM 20.

Figure 16:
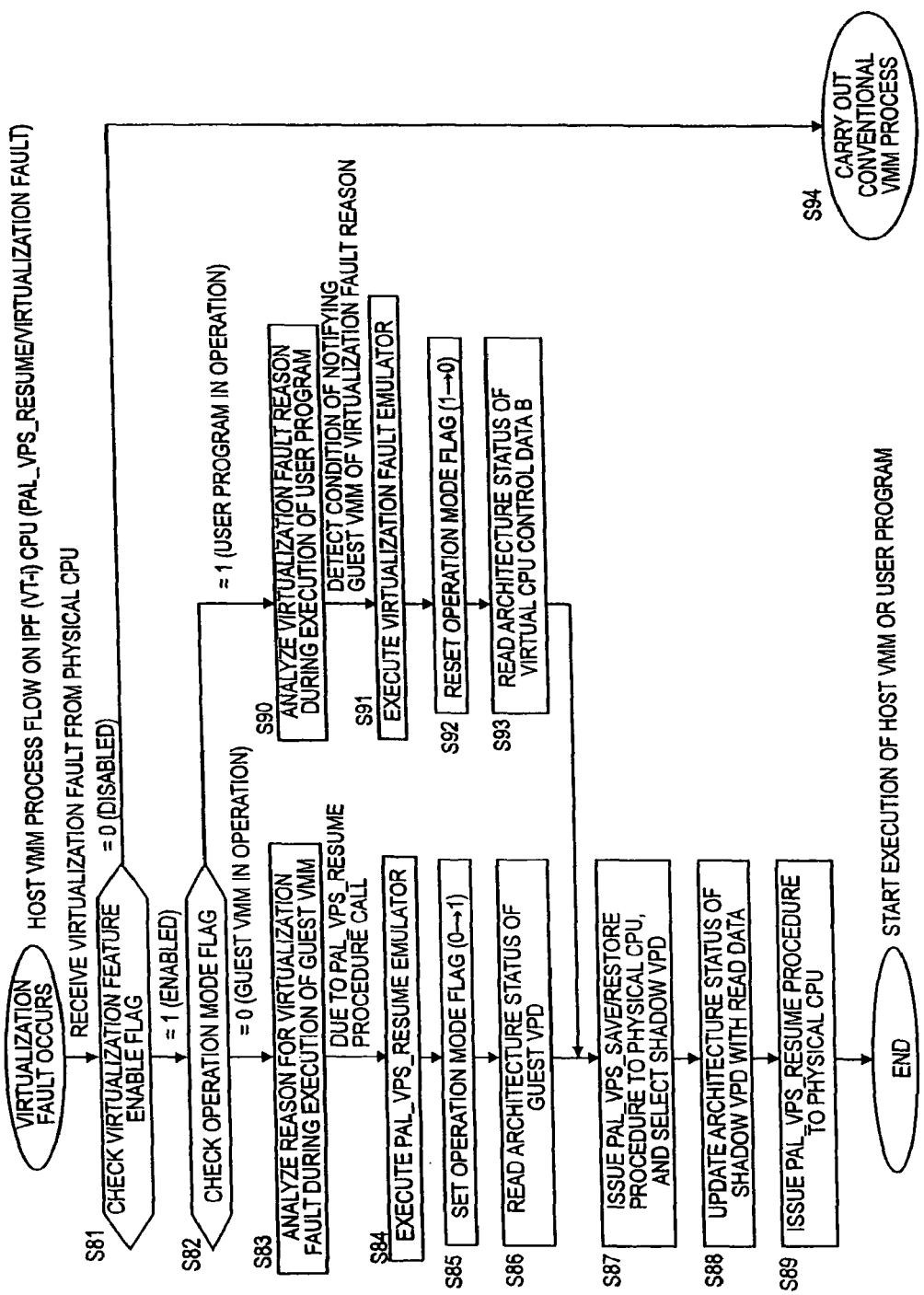
FIG. 16 is a flowchart showing the example of the process carried out by the CPU control module of the host VMM according to a third embodiment of this invention.

A description will now be given of an example of a process carried out by the CPU control module 12 of the host VMM 10 with reference to a flowchart shown in FIG. 16. It should be noted that the following description will be given of an example in which, on the virtual server 102a shown in FIG. 1 according to the first embodiment, the guest OS 111a, which is the next-generation OS, the application program 112a, and the guest VMM 20 are running FIG. 16 is the flowchart showing the example of the process carried out by the CPU control module 12 of the host VMM 10 when the CPU control module 12 receives the virtualization fault from the physical CPU 104b while the virtual server 102a is operating. In this example, the reason for the virtualization fault is the vmsw instruction from the PAL_VPS_RESUME procedure.

First, in Step S81, the CPU control module 12 of the host VMM 10 refers to the virtualization feature enable flag 141 of the host-VMM-held data 11 corresponding to the subject guest OS 111a (hereinafter, referred to as guest OS) which has caused the virtualization fault, and determines whether the guest OS which has caused the virtualization fault can use the VT-i feature. If the virtualization feature enable flag 141 is "1", the CPU control module 12 determines that the subject guest OS can use the VT-i feature, and proceeds to Step S82. On the other hand, if the virtualization feature enable flag 141 is "0", the CPU control module 12 determines that the subject guest OS does not use the VT-i feature, and proceeds to Step S94. In Step S94, the host VMM 10 carries out a conventional virtual machine process by means of the VT-i feature described in "Intel Itanium Architecture Software Developer's Manual".

In Step S82, the CPU control module 12 of the host VMM 10 refers to the operation mode flag 143 of the subject virtual CPU, thereby determining whether the operation mode of the virtual CPU is the host mode (VMX root mode according to the first embodiment) or the guest mode (VMX non-root mode according to the first embodiment). If the operation mode flag 143 is "0", the CPU control module 12 determines that the virtual CPU is in the host mode for executing the guest VMM 20, and the CPU control module 12 proceeds to Step S83. On the other hand, if the operation mode flag 143 is "1", the CPU control module 12 determines that the virtual CPU is in the guest mode for executing the user program, and the CPU control module 12 proceeds to Step S90.

In Step S83, the CPU control module 12 identifies a reason for the generated virtualization fault received from the physical CPU 104b. In this example, since the operation mode of the virtual CPU is the host mode, the CPU control module 12 refers to the architecture status 151 of the virtual CPU control data B 150 of the host-VMM-held data 11 storing the statuses of the guest VMM 20, and identifies the vmsw instruction issued by the guest VMM 20 from the PAL_VPS_RESUME procedure as the reason for the virtualization fault.

Then, in Step S84, the CPU control module 12 executes the PAL_VPS_RESUME procedure module which has caused the virtualization fault, and executes the predetermined process in place of the guest VMM 20, thereby executing a predetermined process (such as the startup of the status area selection module 121) required for switching the operation mode of the subject virtual CPU to the guest mode.

Then, in Step S85, since the CPU control module 12 switches the operation mode of the virtual CPU from the host mode to the guest mode, the CPU control module 12 updates the operation mode flag 143 of the subject virtual CPU to "1".

Then, in Step S86, the CPU control module 12 reads the statuses of the user program (guest OS or application program) stored in the architecture status 2210 from the guest VPD 220 of the virtual CPU control data A 210 of the subject guest VMM 20.

In Step S87, the CPU control module 12 issues the PAL_VPS_SAVE/RESTORE procedure to the physical CPU 104b, and selects the shadow VPD #0 which has caused the issue of the virtualization fault.

Then, in Step S88, the CPU control module 12 writes the statuses of the architecture status 2210 read in Step S86 to the architecture status 1310 of the subject shadow VPD #0 selected in Step S87, thereby updating the architecture status 1310. Then, in Step S89, the CPU control module 12 issues the PAL_VPS_RESUME procedure to the physical CPU 104b.

When the physical CPU 104b receives the PAL_VPS_RESUME procedure, the physical CPU 104b executes the user program (guest OS or application program) of the subject virtual server based on the content of the architecture status 1310 of the shadow VPD #0 selected in Step S87.

On the other hand, if the operation mode flag 143 is "1" in Step S82, the subject virtual CPU is in the guest mode, which indicates that the subject virtual CPU is executing the user program, and the CPU control module 12 executes a process in Step S90. In Step S90, the CPU control module 12 acquires the reason for the virtualization fault, and refers to the list of reasons for the virtualization fault shown in FIG. 15A, FIG. 15B and FIG. 15C, thereby searching the notice conditions 1334 for the virtualization fault notice condition directed to the guest VMM 20. In this example, since the reason for the virtualization fault is the vmsw instruction, the virtualization fault notice condition follows the setting in the VDC field 2202 of the guest VMM 20. On this occasion, the virtualization fault is notified to the guest VMM 20. Then, in Step S91, the CPU control module 12 executes the virtualization fault condition detection module of FIG. 13, thereby emulating a predetermined process (such as the startup of the status area selection module 121) required for switching the operation mode of the subject virtual CPU to the host mode in place of the guest VMM 20.

Then, in Step S92, in order to switch the operation mode of the subject virtual CPU from the guest mode to the host mode, the CPU control module 12 resets the operation mode flag 143 of the subject virtual CPU to "0".

Then, in Step S93, the CPU control module 12 reads the statuses of the guest VMM 20 stored in the architecture status 151 of the virtual CPU control data B 150 corresponding to the subject virtual CPU in the host-VMM-held data 11.

When the CPU control module 12 has completed the process in Step S93, the CPU control module 12 carries out Steps S87 to S89, updates the architecture status 1310 of the subject shadow VPD with the information of the architecture status 151 of the virtual CPU control data B 150 of the host-VMM-held data 11 read in Step S93, and issues the PAL_VPS_RESUME procedure to the physical CPU 104b. As a result, when the physical CPU 104b receives the PAL_VPS_RESUME procedure, the physical CPU 104b executes the guest VMM 20 of the subject virtual server based on the content of the architecture status 1310 of the shadow VPD #0.

In this way, if the guest OS running on the virtual server is the next-generation OS incorporating the virtualization feature, the host VMM 10 selects the statuses to be written to the architecture status 1310 of the shadow VPD from one of the guest VMM 20 and the user program according to the operation mode of the virtual CPU and the reason for a generated virtualization fault. Then, when the host VMM 10 issues the PAL_VPS_RESUME procedure to the physical CPU 104b, it is possible to switch between the executions of the guest VMM 20 and the user program running on the second virtual CPU 208a provided by the guest VMM 20 on the virtual server, and the guest VMM 20 can thus provide a virtualization environment on the virtual server.

If it is determined that the guest OS does not use the virtualization feature in Step S81, the virtual machine process according to Publication of Translation of International Application No. 2005-529401, or "Intel Itanium Architecture Software Developer's Manual", cited in "BACKGROUND OF THE INVENTION", may be carried out by the host VMM 10 in Step S94.

In the virtual machine process in Step S94, for example, the guest OS 111n of the virtual server 102n shown in FIG. 1 is a conventional OS, and if this guest OS 111n or the application program 112n (user program 110n) executes an instruction of the reason for the virtualization fault, as described above, the physical CPU 104b notifies the host VMM 10 of the generation of the virtualization fault.

When the host VMM 10 receives the notice of the virtualization fault from the physical CPU 104b, the host VMM 10 stores the statuses of the user program 110*n* (virtual CPU 108*n*) in the architecture status 151 of the virtual CPU control data B 150.

When the host VMM 10 has emulated the instruction which has caused the virtualization fault, the host VMM 10 issues the PAL_VPS_RESUME procedure, passes the control to the virtual CPU 108*n*, and resumes the execution of the user program 110*n*.

In this way, according to the third embodiment, as well as the first embodiment, it is possible to integrate a next-generation OS incorporating the virtualization feature and a conventional OS into the single physical server 101, thereby reducing the number of physical servers, and reducing the operation/management cost of the servers.

Moreover, as described above, the host VMM 10 can make it appear to the next-generation OS that the virtual CPU provides the VT-i feature, thereby enabling the OS incorporating the virtualization software program to surely operate. Moreover, with the host VMM 10 according to this invention, there is no overhead caused by the conversion of an instruction sequence as in the conventional simulator, and thus, there is no decrease in the performance of the virtual computer, and the OS incorporating the virtualization feature can be executed on the virtual server.

It should be noted that the processors described as the physical CPU's 104, 104*a*, and 104*b* according to the respective embodiments may be a configuration of a multi-core processor, and can employ homogeneous or heterogeneous processors. In other words, when, as the physical CPU's 104, 104*a*, and 104*b*, a heterogeneous multi-core processor including a plurality of general-purpose processor cores (CPU's) and special-purpose processor cores is used, as long as the general-purpose processor core has the virtualization support feature, this invention can be applied.

As described above, this invention may be applied to a virtual computer system providing a plurality of virtual servers. Moreover, this invention may be applied to a virtual machine manager (VMM) software program providing a plurality of virtual servers on a physical computer.

While the present invention has been described in detail and pictorially in the accompanying drawings, the present invention is not limited to such detail but covers various obvious modifications and equivalent arrangements, which fall within the purview of the appended claims.

What is claimed is:

1. A computer readable, non-transitory storage medium storing a virtualization program to run a host virtual machine manager and a guest virtual machine manager by being executed in a physical computer including a physical processor and a memory, the virtualization program stored on the computer readable, non-transitory storage medium causing the physical processor to execute the steps of:
storing, by the guest virtual machine manager, first control information for specifying a status of a virtual processor to execute a user program to the memory;
storing, by the guest virtual machine manager, second control information for specifying a status of the virtual processor to execute the guest virtual machine manager to the memory;
managing, by the host virtual machine manager, an operation mode flag which indicates which of the user program and the guest virtual machine manager is operating on the virtual processor;
updating, by the host virtual machine manager, third control information for specifying a status of the physical processor with one of the first control information and the second control information in accordance with a determination of which of the user program and the guest virtual machine manager is to be executed by referring the operation mode flag; and
issuing, by the host virtual machine manager, a first control instruction for the physical processor to execute one of the user program and the guest virtual machine manager based on the third control information.

2. The non-transitory storage medium according to claim 1, causing the physical processor to further execute the step of determining, by the host virtual machine manager, which of the guest virtual machine manager and the user program is to be executed based on a call for the host virtual machine manager received from the physical processor,
wherein the step of the updating, by the host virtual machine manger, the third control information includes the step of determining, by the host virtual machine manager, which of the first control information and the second control information is to be a basis to update the third control information, based on a result of the determination.

3. The non-transitory storage medium according to claim 2, causing the physical processor to further execute the step of issuing, by the guest virtual machine manager, a third control instruction for checking whether the first control instruction is acceptable for the virtual processor,
wherein the step of determining, by the host virtual machine manager, which of the guest virtual machine manager and the user program to be executed includes the steps of:
referring to preset acceptability information in a case where a cause of the call for the host virtual machine manager is the third control instruction from the guest virtual machine manager; and
determining a response to the third control instruction in accordance with the acceptability information.

4. The non-transitory storage medium according to claim 3, causing the physical processor to further execute the steps of:
receiving, by the host virtual machine manager, a setting request for the virtual processor; and
setting, by the host virtual machine manager, the acceptability information based on the setting request.

5. The non-transitory storage medium according to claim 3, causing the physical processor to further execute the steps of:
receiving, the guest virtual machine manager, a response to the third control instruction from the host virtual machine manager; and
issuing, by the guest virtual machine manager, an instruction to configure the virtual processor to be allowed to receive the first control instruction, in a case where the guest virtual machine manager determines that the first control instruction is acceptable for the virtual processor based on the response to the third control instruction.

6. The non-transitory storage medium according to claim 2,
wherein, in the case where a cause of the call for the host virtual machine manager is a call for the guest virtual machine manager to include information on an operation status of the virtual processor into the first control information, the step of determining, by the host virtual machine manager, which of the guest virtual machine manager and the user program to be executed includes the steps of:
issuing, by the host virtual machine manager, a fourth control instruction for the physical processor to include information on an operating status of the physical processor in the third control information;
referring to, by the host virtual machine manager, the third control information including the information on the operation status of the physical processor; and
determining, by the host virtual machine manager, whether the guest virtual machine manager is to be executed after updating the first control information based on the third control information referred to.

7. The non-transitory storage medium according to claim 1,
wherein the virtualization program is executed in the physical computer to provide a plurality of virtual processors,
wherein the step of updating, by the host virtual machine manager, the third control information includes the step of storing the third control information on each of the plurality of virtual processors to the memory, and
wherein the step of issuing, by the host virtual machine manager, the first control instruction to the physical processor includes the step of issuing a second control instruction to request to select the third control information on one of the plurality of virtual processors.

8. A virtual computer system, comprising:
a physical computer including a physical processor and one or more storage media, the storage media storing instructions that, when executed by the physical processor, cause the physical processor to run a host virtual machine manager and a quest virtual machine manager thereon,
wherein the guest virtual machine manager is configured to:
store first control information for specifying a status of a virtual processor to execute a user program and second control information for specifying a status of the virtual processor to execute the guest virtual machine manager to the storage media, and
wherein the host virtual machine manager is configured to:
store third control information for specifying a status of the physical computer to execute the guest virtual machine manager or the user program to the storage media,
manage an operation mode flag which indicates which of the user program and the guest virtual machine manager is operating on the virtual processor,
update the third control information with one of the first control information and the second control information in accordance with a determination of which of the user program and the guest virtual machine manager is to be executed by referring to an operation mode flag, and
issue a first control instruction for the physical processor to execute one of the user program and the guest virtual machine manager based on the third control information.

9. The virtual computer system according to claim 8,
wherein the host virtual machine manager is further configured to:
determine which of the guest virtual machine manager and the user program is to be executed based on a call for the host virtual machine manager received from the physical processor; and
select one of the first control information and the second control information based on a result of the determination, and
update the third control information with the selected one of the first control information and the second control information.

10. The virtual computer system according to claim 9,
wherein the host virtual machine manager is further configured to;
issue a third control instruction for checking whether the first control instruction is acceptable for the virtual processor,
refer to preset acceptability information in a case where a cause of the call for the host virtual machine manager is the third control instruction from the guest virtual machine manager, and
determine a response to the third control instruction in accordance with the acceptability information.

11. The virtual computer system according to claim 10,
wherein the host virtual machine manager is further configured to:
set the acceptability information based on a setting request for the virtual processor.

12. The virtual computer system according to claim 10,
wherein the host virtual machine manager is further configured to:
issue an instruction to configure the virtual processor to be allowed to receive the first control instruction, in a case where the first control instruction is acceptable for the virtual processor.

13. The virtual computer system according to claim 9,
wherein, in a case where a cause of the call for the host virtual machine manager is a call for the guest virtual machine manager to include information on an operation status of the virtual processor into the first control information, the host virtual machine manager is further configured to:
issue a fourth control instruction for the physical processor to include information on an operating status of the physical processor in the third control information;
refer to the third control information including the information on the operation status of the physical processor; and
determine whether the guest virtual machine manager is to be executed after updating the first control information based on the third control information referred to.

14. The virtual computer system according to claim 8,
wherein the virtual computer system is configured to have a plurality of virtual processors,
wherein the host virtual machine manager is configured to:
store the third control information on each of the plurality of virtual processors to the storage media, and
instruct the physical processor to select the third control information on one of the plurality of virtual processors and to execute the guest virtual machine manager or the user program.

15. A computer system control method in a virtual computer system running a host virtual machine manager and a guest virtual machine manager on a physical computer including a physical processor and a memory, the method comprising:
storing, by the guest virtual machine manager, first control information for specifying a status of a virtual processor to execute a user program to the memory;
storing, by the guest virtual machine manager, second control information for specifying a status of the virtual processor to execute the guest virtual machine manager to the memory;

managing, by the host virtual machine manager, an operation mode flag which indicates which of the user program and the guest virtual machine manager is operating on the virtual processor;

updating, by the host virtual machine manager, third control information for specifying a status of the physical processor with one of the first control information and the second control information in accordance with a determination of which of the user program and the guest virtual machine manager is to be executed by referring to the operation mode flag; and issuing, by the host virtual machine manager, a first control instruction for the physical processor to execute one of the user program and the guest virtual machine manager based on the third control information.

* * * * *